United States Patent
Stojancic et al.

(10) Patent No.: US 11,706,481 B2
(45) Date of Patent: Jul. 18, 2023

(54) MEDIA CONTENT IDENTIFICATION ON MOBILE DEVICES

(71) Applicant: Roku, Inc., San Jose, CA (US)

(72) Inventors: Mihailo M. Stojancic, San Jose, CA (US); Daniel H. Eakins, Palo Alto, CA (US); Shashank Merchant, Sunnyvale, CA (US); Prashant Ramanathan, Mountain View, CA (US); Jose Pio Pereira, Cupertino, CA (US)

( * ) Notice: Subject to any disclaimer, the term of this patent is extended or adjusted under 35 U.S.C. 154(b) by 0 days.

(21) Appl. No.: 16/441,987

(22) Filed: Jun. 14, 2019

(65) Prior Publication Data

US 2019/0379929 A1    Dec. 12, 2019

Related U.S. Application Data

(60) Continuation of application No. 15/053,064, filed on Feb. 25, 2016, now Pat. No. 11,336,952, which is a
(Continued)

(51) Int. Cl.
*H04N 21/439* (2011.01)
*H04N 21/8352* (2011.01)
(Continued)

(52) U.S. Cl.
CPC ....... *H04N 21/4394* (2013.01); *G10H 1/0008* (2013.01); *H04N 1/32* (2013.01);
(Continued)

(58) Field of Classification Search
CPC .................. H04N 21/4394; H04N 1/32; H04N 21/41407; H04N 21/43072;
(Continued)

(56) References Cited

U.S. PATENT DOCUMENTS 6,799,164 B1    9/2004    Araki
7,684,981 B2    3/2010    Thumpudi et al.
(Continued)

OTHER PUBLICATIONS

Jerry D. Gibson et al., "Log Likelihood Spectral Distance, Entropy Rate Power, and Mutual Information with Applications to Speech Coding," University of California, Sep. 2017, (14 pages).
(Continued)

*Primary Examiner* — Sumaiya A Chowdhury
(74) *Attorney, Agent, or Firm* — Sterne, Kessler, Goldstein & Fox P.L.L.C.

(57) ABSTRACT

A mobile device responds in real time to media content presented on a media device, such as a television. The mobile device captures temporal fragments of audio-video content on its microphone, camera, or both and generates corresponding audio-video query fingerprints. The query fingerprints are transmitted to a search server located remotely or used with a search function on the mobile device for content search and identification. Audio features are extracted and audio signal global onset detection is used for input audio frame alignment. Additional audio feature signatures are generated from local audio frame onsets, audio frame frequency domain entropy, and maximum change in the spectral coefficients. Video frames are analyzed to find a television screen in the frames, and a detected active television quadrilateral is used to generate video fingerprints to be combined with audio fingerprints for more reliable content identification.

20 Claims, 20 Drawing Sheets

Related U.S. Application Data division of application No. 13/590,701, filed on Aug. 21, 2012, now Pat. No. 9,313,359.

(60) Provisional application No. 61/601,234, filed on Feb. 21, 2012.

(51) Int. Cl.

| | |
|---|---|
| *G10H 1/00* | (2006.01) |
| *H04N 21/414* | (2011.01) |
| *H04N 21/422* | (2011.01) |
| *H04N 21/4223* | (2011.01) |
| *H04N 21/433* | (2011.01) |
| *H04N 21/84* | (2011.01) |
| *H04N 21/845* | (2011.01) |
| *H04N 1/32* | (2006.01) |
| *H04N 21/43* | (2011.01) |

(52) U.S. Cl.
CPC ... *H04N 21/41407* (2013.01); *H04N 21/4223* (2013.01); *H04N 21/42203* (2013.01); *H04N 21/439* (2013.01); *H04N 21/4332* (2013.01); *H04N 21/43072* (2020.08); *H04N 21/8352* (2013.01); *H04N 21/84* (2013.01); *H04N 21/8456* (2013.01); *G10H 2210/041* (2013.01); *G10H 2210/051* (2013.01); *G10H 2240/141* (2013.01); *G10H 2250/235* (2013.01)

(58) Field of Classification Search
CPC ......... H04N 21/42203; H04N 21/4223; H04N 21/439; G10H 1/0008
See application file for complete search history.

(56) References Cited

U.S. PATENT DOCUMENTS

| | | | |
|---|---|---|---|
| 8,744,863 | B2 | 6/2014 | Neuendorf et al. |
| 9,313,359 | B1 | 4/2016 | Stojancic et al. |
| 11,336,952 | B2 | 5/2022 | Stojancic et al. |
| 11,445,242 | B2 | 9/2022 | Stojancic et al. |
| 2003/0088411 | A1 | 5/2003 | Ma et al. |
| 2003/0152291 | A1 | 8/2003 | Cheatle |
| 2006/0187358 | A1* | 8/2006 | Lienhart ............... H04N 21/812 348/661 |
| 2006/0253276 | A1 | 11/2006 | Kang et al. |
| 2009/0012638 | A1 | 1/2009 | Lou |
| 2009/0023406 | A1* | 1/2009 | Ellis ....................... H04H 60/82 455/140 |
| 2011/0137976 | A1* | 6/2011 | Poniatowski ...... H04N 21/8133 709/203 |
| 2011/0153351 | A1 | 6/2011 | Vesper et al. |
| 2011/0276333 | A1* | 11/2011 | Wang ..................... G06F 16/95 704/270 |
| 2011/0311095 | A1* | 12/2011 | Archer ............... H04N 21/8358 382/100 |
| 2012/0095755 | A1 | 4/2012 | Otani et al. |
| 2012/0095958 | A1* | 4/2012 | Pereira ..................... G06F 16/41 707/609 |
| 2012/0117584 | A1* | 5/2012 | Gordon ............ H04N 21/44213 725/19 |
| 2012/0307064 | A1 | 12/2012 | Schenken et al. |
| 2013/0202150 | A1 | 8/2013 | Sinha et al. |
| 2013/0205315 | A1 | 8/2013 | Sinha et al. |
| 2015/0040074 | A1 | 2/2015 | Hofmann |
| 2016/0140972 | A1 | 5/2016 | Dick et al. |
| 2016/0249093 | A1 | 8/2016 | Stojancic et al. |
| 2016/0307576 | A1 | 10/2016 | Fuchs et al. |
| 2019/0379930 | A1 | 12/2019 | Stojancic et al. |

OTHER PUBLICATIONS

United States Patent and Trademark Office, Corrected Notice of Allowability, issued in connection with U.S. Appl. No. 13/590,701, dated Mar. 11, 2016, 2 pages.

United States Patent and Trademark Office, Notice of Allowance, issued in connection with U.S. Appl. No. 13/590,701, dated Dec. 2, 2015, 7 pages.

United States Patent and Trademark Office, Requirement for Restriction/Election, issued in connection with U.S. Appl. No. 13/590,701, dated Jul. 14, 2015, 7 pages.

Bello, J.P., Daudet, L., Abdallah, S., Duxbury, C., Davies, M., Sandler, M.B. "A Tutorial on Onset Detection in Music Signals", (2005) pp. 1035-1047, IEEE Transactions on Speech and Audio Processing 13(5).

European Telecommunications Standards Institute (ETSI), Speech Processing, Transmission and Quality Aspects (STQ); Distributed speech recognition; Front-end feature extraction algorithm; Compression algorithms. (2003) Technical standard ES 201 108, v1.1.3.

Requirement for Restriction/Election for U.S. Appl. No. 15/053,064 dated Nov. 18, 2016, 11 pages.

Non-Final Office Action for U.S. Appl. No. 15/053,064 dated Mar. 30, 2017, 13 pages.

Final Office Action for U.S. Appl. No. 15/053,064 dated Feb. 15, 2018, 14 pages.

Non-Final Office Action for U.S. Appl. No. 15/053,064 dated Sep. 18, 2018, 18 pages.

Final Office Action for U.S. Appl. No. 15/053,064 dated Apr. 23, 2019, 14 pages.

Final Office Action for U.S. Appl. No. 16/441,996 dated Dec. 15, 2020, 20 pages.

Advisory Action for U.S. Appl. No. 16/441,996 dated Feb. 26, 2021, 3 pages.

Non-Final Office Action for U.S. Appl. No. 16/441,996 dated Jun. 10, 2021, 12 pages.

Non-Final Office Action for U.S. Appl. No. 16/441,996 dated Jun. 30, 2020, 16 pages.

* cited by examiner

MEDIA CONTENT IDENTIFICATION ON MOBILE DEVICES

The present application is a continuation of U.S. patent application Ser. No. 15/053,064, filed Feb. 25, 2016, which is a divisional of U.S. patent application Ser. No. 13/590,701, filed Aug. 21, 2012 which claims the benefit of U.S. Provisional Patent Application No. 61/601,234 entitled "Methods and Apparatus for Synchronous Television/Media Content Identification on Mobile/Media Devices", filed on Feb. 21, 2012 which are hereby incorporated by reference in their entirety.

CROSS REFERENCE TO RELATED APPLICATION

U.S. Pat. No. 8,229,227 filed on Jun. 18, 2008 entitled "Methods and Apparatus for Providing a Scalable Identification of Digital Video Sequences", U.S. Pat. No. 8,171,030 filed on Jun. 18, 2008 entitled "Method and Apparatus for Multi-Dimensional Content Search and Video Identification", U.S. Pat. No. 8,189,945 filed on Nov. 5, 2009 entitled "Digital Video Content Fingerprinting Based on Scale Invariant Interest Region Detection with an Array of Anisotropic Filters", U.S. Pat. No. 8,195,689 filed on May 3, 2010 entitled "Media Fingerprinting and Identification System", U.S. patent application Ser. No. 13/094,158 filed on Apr. 26, 2011 entitled "Actionable Event Detection for Enhanced Television Delivery and Ad Monitoring Based on Video/Audio Content Fingerprinting", and U.S. Provisional Patent Application Ser. No. 61/610,672 filed on Mar. 14, 2012 entitled "A Method for Efficient Data Base Formation and Search on Portable Media Devices Acting Synchronously with Television Programming", have the same assignee as the present application, are related applications and are hereby incorporated by reference in their entirety.

FIELD OF THE INVENTION

The present invention relates to identifying television or other media programming at a receiving station by using a mobile device. More particularly, the present invention addresses design of an efficient television/media identification system based on fingerprinting of captured audio and video signals in the presence of ambient noise, including speech and music interference from multiple external sources, as well as various optical and geometry distortions of the video signal.

BACKGROUND OF THE INVENTION

Recent development of audio and video content fingerprinting technologies and capable mobile devices, such as smart phones and tablets, have opened up a plethora of new possibilities in developing sophisticated real time applications associated with detected television programming events. With the ubiquity of mobile devices, especially smart mobile phones, a large proportion of the population often simultaneously watch programming content on their television while using their portable mobile device for text messaging or other Internet related activities. Due to the presence of varying levels of ambient noise and image distortions, reliably identifying content that is being played on a television set is considered a difficult capability to provide on a portable mobile device. Such capability has to be robust to potential audio and video degradation in order to accurately process and identify audio and video content.

SUMMARY OF THE INVENTION

In one or more of its several embodiments, the invention addresses problems such as those outlined in the previous section. One embodiment of the invention addresses a method for a mobile device to respond in real time to content identified on a television program display device. Audio content generated on a television (TV) display device is captured as a waveform from a microphone on the mobile device. Video content displayed on the TV display device is captured as a set of video frames from an optical image capture device on the mobile device. Contours of a TV display screen on the TV display device are detected in one or more video frames on the mobile device, wherein the detected contours of the TV display screen are overlaid on images of the captured video content displayed on the mobile device.

Another embodiment addresses a method for audio fingerprinting by using content based audio feature extraction. Input audio samples, divided into overlapping frames, are analyzed to produce windowed audio frame samples for each overlapped frame. A fast Fourier transform (FFT) for the windowed audio frame samples is computed which FFT results are filtered by a filter bank on the spectral components to produce a set of filter bank output coefficients. A log function and a square root function of each set of filter bank output coefficients are computed to produce log and square root output coefficients. A discrete cosine transform (DCT) is applied separately to the log and square root output coefficients to produce two sets of DCT spectral components. A temporal multi-tap finite impulse response (FIR) smoothing derivative filter is applied to the two sets of DCT spectral components to produce two separate primary descriptors, wherein values in the two separate primary descriptors are sampled to produce two primary signatures.

Another embodiment addresses a method for audio content feature extraction. An onset in a time domain is detected for each audio frame of a plurality of audio frames. A frequency domain entropy is calculated for each audio frame of the plurality of audio frames to produce an entropy difference between consecutive frames. A maximum difference in the spectral output coefficients is calculated for each audio frame of the plurality of audio frames.

Another embodiment of the invention addresses a method for audio signal onset detection and audio frame time positions for alignment based on detected audio signal onsets. A multi-channel audio signal is down mixed to a mono signal and resampled to a desired sampling rate. An energy waveform of the audio signal is computed by squaring the audio waveform. A low-pass filter is applied to the energy signal and resampled to a minimum sampling period. A filtered derivative of the resulting resampled signal is computed for different filter widths. Maximum indices of the filtered derivative signal are computed for different maximum filter widths to produce time positions of maximum indices that exceed a threshold, wherein the time positions represent onset events.

Another embodiment addresses a method to enable mobile device software applications to provide a real time response to an identified segment of broadcast television media content. Audio content and video content are captured on a mobile device. On the mobile device, multi-dimensional audio and video query signatures and multi-dimensional feature signatures are generated for audio and video features identified in a temporal segment of audio and video data received on the mobile device. On the mobile device, cluster query signatures are generated based on a combination of the multi-dimensional audio and video query signatures and the multi-dimensional feature signatures. A reference multimedia clip database is searched, as initiated by the mobile device, using the multi-dimensional cluster query signature for fast reference data base traversal to find a set of signatures that are within a specified signature distance to the multi-dimensional query signature, wherein the mobile device is provided access to data related to multimedia content associated with a likely matching signature selected from the set of signatures. Based on the search results, a software application is triggered within the mobile device, which performs at least one action that is synchronized to the identified captured audio and video content.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-readable non-transitory storage medium having computer-usable program code embodied in the storage medium. Any suitable computer readable non-transitory medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module that stores non-transitory signals executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. A computer-readable non-transitory storage medium may be coupled to the processor through local connections such that the processor can read information from, and write information to, the storage medium or through network connections such that the processor can download information from or upload information to the storage medium. In the alternative, the storage medium may be integral to the processor.

Figure 1:
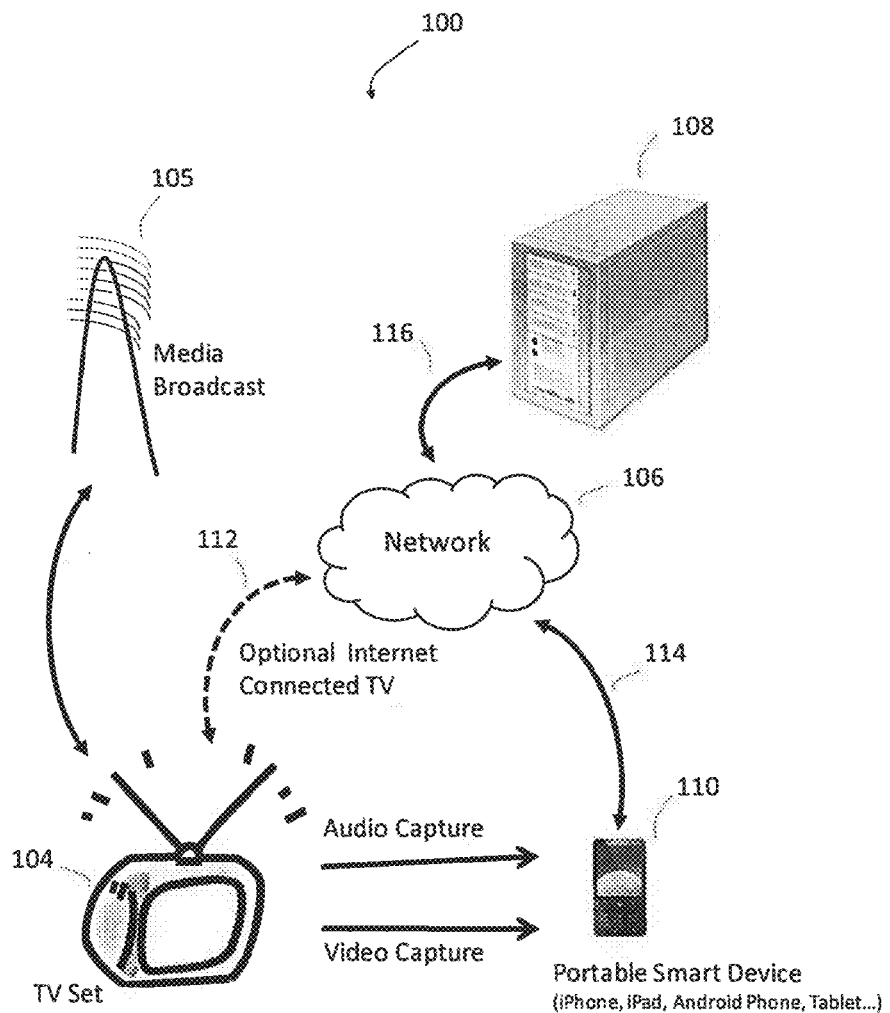
FIG. 1 illustrates a system for providing mobile device applications in accordance with the present invention based on analysis of audio, video, or audio and video signals acquired from a media presentation device.

FIG. 1 illustrates a system 100 for providing mobile device applications in accordance with the present invention based on analysis of audio, video, or audio and video signals acquired from a media presentation device. The input of audio, video, or audio and video signals hereinafter is referred to as media content. One embodiment addresses a method to identify media content, by acquiring media content on a mobile device from a media presentation device, appropriately processing the media content, fingerprinting the media content, and searching fingerprint databases to identify the media content. The system 100 includes a media presentation device 104, such as a television set, a desktop, laptop, or tablet computer, a digital video disc (DVD) player, or a smartphone device configured to display television programming or play audio media such as wireless received radio signals, compact discs (CDs), or the like. The media presentation device, such as a television set, may be connected to a remote media broadcast system 105 for receiving television programming content. Also, the media presentation device 104 may or may not be connected to the Internet 106. The system 100 also includes a remote content identification system 108 and a mobile device 110 connected over the Internet 106 to the remote content identification system 108. Connections 112, 114, and 116 may be wired or cabled connections, wireless connections, or a combination of wire cable and wireless connections. For example, the mobile device 110 may connect wirelessly to the Internet 106 through a wireless router or over 3G or 4G networks while the remote content identification system 108 may be wire or cable attached through a modem to the Internet 106. The mobile device 110 may be configured to acquire audio signals from the media presentation device 104 by use of a microphone. The mobile device 110 may also be configured to acquire images or a video from the media presentation device 104 by use of a charge coupled device (CCD) image sensor and a camera lens assembly included in the mobile device 110.

Illustrated system 100 supports applications on the mobile device 110 that operate in real time and in accordance with television or other media programming content that is being presented on a media presentation device 104 and received by the mobile device 110.

The mobile device 110 is configured to acquire a temporal fragment of media content, including audio content, video content, or both, that are playing on the media presentation device 104, using the mobile device's microphone, camera, or both, and generates query fingerprints of the temporal fragment of the acquired media content. A chunk of the query fingerprints, which is a set of the query fingerprints corresponding to a time segment of the query audio signal, or a digest of the chunk of the query fingerprints are transmitted as a search query to the remote content identification system 108, also referred to as a remote search server 108, for content identification. A digest of the query fingerprints is a summarization of the fingerprints generated for the acquired media content. If the search query is found in a reference database of the search server 108, the search server 108 responds with a title and timing information of the identified media content, along with related metadata, and sends the title, the timing information, and the related metadata to the mobile device 110. The original chunk of query reference fingerprints or the digest of the query fingerprints is stored on the mobile device 110 for further use in querying a mobile device database located on the mobile device 110 and tracking of media content. The mobile device 110 may be configured to continuously listen, observe, or listen and observe the media programming content. If a change in the media programming content is detected, the mobile device 110 generates one or more new queries that are sent to the remote search server 108 for content identification. If the new query is found in the reference database of the remote search server 108, the search server 108 responds with a title and timing of the media content associated with the new query, along with related metadata, and sends the identified information to the mobile device 110. The original new chunk of reference fingerprints are stored on the mobile device 110 for further use in querying and tracking operations locally on the mobile device 110. This process continues as long as the mobile device 110 is listening, or observing, or both to the media programming content. The mobile device 110 may be equipped with an actionable program event detection system, which generates an action signal upon detection of a particular audio, or video, or audio and video fragment stored in the reference fingerprint database. A software application running on the mobile device 110 can then perform actions based on local search results, presenting to the user a variety of additional information on the same mobile device 110 in real time while the remote media programming is still playing the associated media content.

For example, a movie that started at 9 PM is being watched on a television set 104. A user enables an application on a mobile device 110, such as a smartphone, that configures the smartphone 110 to acquire a fragment of media content, which may include a fragment of audio content, a fragment of video content, or fragments of both audio and video content. For example, a fragment may be five seconds of background music from a scene in the movie. A fragment may also be a snapshot of a character in the movie or may be a short narrative given by a leading character in the movie. If a video fragment is acquired by a mobile camcorder or camera operating on the smartphone 110, video frames of the fragment are initially analyzed to find the TV screen in the frames. In an exemplary case, the screen location step may be done by running edge detection on selected frames, which may also include running contour detection on the selected frames, combined with contour thresholding and selection, and searching for an initial quadrilateral of appropriate dimensions. A detected quadrilateral is further refined by tracking motion from frame to frame of pixel formations inside and in the immediate neighborhood of the quadrilateral. Also, brightness and color of the detected quadrilateral can be checked against the rest of a frame's content to further increase confidence that the TV screen area is correctly delineated. The user may be informed that a TV screen is detected by displaying an outline of a TV screen quadrilateral on the smart phone display. If no TV screen is found, then the lack of acquiring a TV screen may be communicated to the user by appropriately changing the appearance of virtual guidelines on the smartphone display, by making them flash, changing their color, and the like, for example. In the case of a detected TV screen, the frame area corresponding to the detected quadrilateral is cropped and warped to an upright rectangle and used for video fingerprint generation of the TV programming content captured from the TV set. Also, if the smart phone is held close to the TV, the video captured on the smartphone may be filled with content from the TV screen and a TV screen detection process would not be used. In such a case, the original captured frames are processed as holding TV programming content.

The application generates query fingerprints for the acquired fragment of media content as described in U.S. Pat. Nos. 8,229,227, 8,171,030, 8,189,945, and 8,195,689, and U.S. patent application Ser. No. 13/094,158 which are incorporated by reference in their entirety. The application transmits the query fingerprints as a search query to a remote search server 108 which searches for the transmitted content in a reference database of the remote search server 108. If media content associated with the query fingerprints is discovered, the remote search server 108 retrieves related content, such as a title of the media content, timing information and identifies other related information which the user may have previously requested and forwards the related content and associated information to the user's smartphone 110 for presentation to the user. At this point, the television programming is tracked in real time and preprogrammed events are identified, such as a change in television program, or onset of a selected type of commercial, or entrance of a particular character, with sub-second resolution and to trigger a notification action to alert the user.

Figure 2:
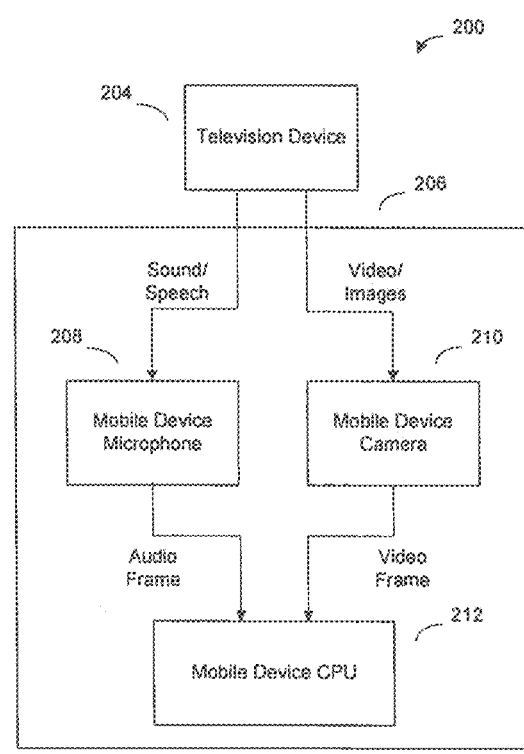
FIG. 2 illustrates a media acquisition subsystem configured to acquire played television media content from a television device on a mobile device.

By using such a content identification system, it is possible to configure a real-time media content analysis software application, to run on the mobile device itself. FIG. 2 illustrates a media acquisition subsystem 200 configured to acquire played television media content from a television device 204 on a mobile device 206. The television device 204 is configured to play a television program that generates sounds and speech from speakers in synchronism with images and video from a display device, such as a liquid crystal display (LCD) or light emitting diode (LED) display. The mobile device 206 is configured with a microphone 208 to acquire the sounds and speech and transform the sounds and speech to audio signals. The mobile device 206 is also configured with a camera device 210 that acquires the images and video, and transforms the images and video to a sequence of pixels or frames of pixels. The mobile device 206 is configured with a central processing unit (CPU) system 212 that acquires the audio and pixel data for analysis.

A technical concern in enabling mobile applications to operate in real time with, for example, television content played on a nearby television device is to be able to accurately identify the media content acquired directly from the TV set by the mobile device's microphone, camera, or both. Such acquisition operates in a dynamic environment of the mobile devices which tends to degrade the quality of the content being acquired. For example, the quality of an audio signal may be degraded by sources including lossy encoding of the source audio, fidelity limitations of the speaker system, equalization, multi-path interference using a multi-speaker system, fidelity limitations of the microphone on the mobile device, automatic gain adjustments or equalization on the speaker and/or microphone, and the encoding of the audio on the mobile device. With such degradations in the audio content, content identification based on the audio signal captured from a nearby TV set is a challenging problem. Even more severe signal degradation situations may arise with respect to the image and video pixel data acquired from a nearby TV set. The sources of degradation are numerous, including the encoding of the source video, fidelity limitations of a display device, such as a the television screen, automatic brightness and contrast adjustments on the display device, the fidelity limitations of the video camera on the mobile device, automatic brightness and contrast adjustments of the video camera on the mobile device, environmental lighting conditions, the viewing angle of the camera and any perspective distortion ensuing, and the encoding of the video on the mobile device.

Figure 3:
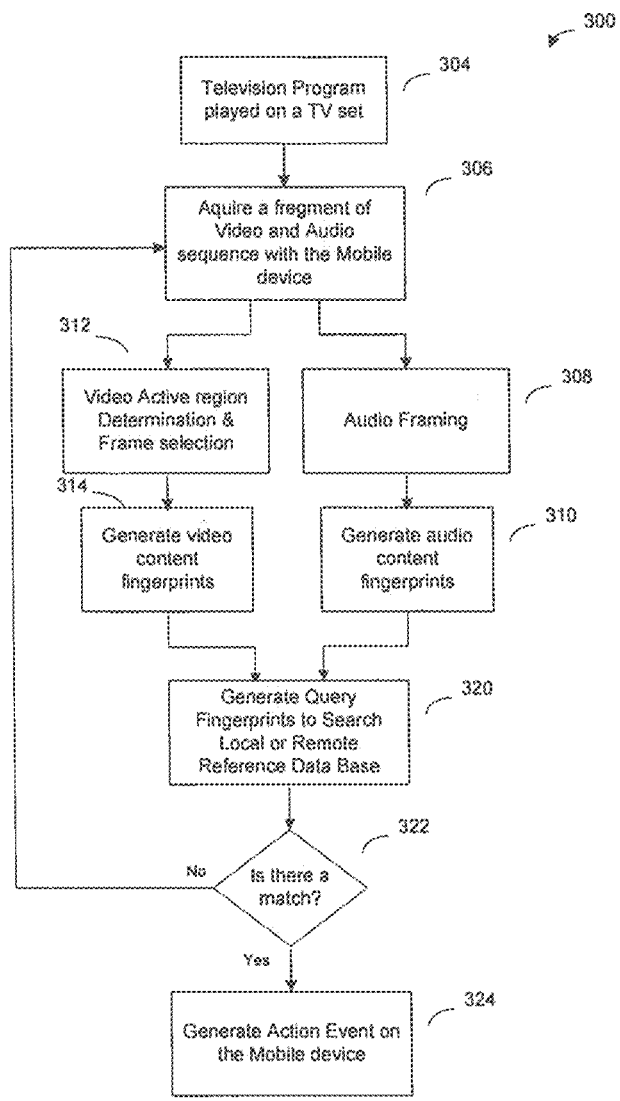
FIG. 3 illustrates a process for identification of audio or video content captured by a mobile device from a nearby TV set and triggering a mobile application action.

FIG. 3 illustrates a process 300 for identification of audio or video content captured by a mobile device from a nearby TV set and triggering a mobile application action. At step 304, a television program is selected to be played on a TV set. At step 306, a fragment of audio and video signals are acquired on the mobile device. The audio and video signals are passed to the associated step in the mobile application for processing the audio and video signals as an audio waveform and video frames, respectively. At step 308, the audio waveform is framed. At step 310, the framed audio waveform is fingerprinted with an audio fingerprinting system. At step 312, one or more active regions are determined in the video frames and a set of frames are selected for further processing. At step 314, active TV regions in the selected video frames are fingerprinted with a video fingerprinting system. This fingerprinting may occur entirely locally on the mobile device, entirely remotely on a remote server, or partially locally and remotely. If performed entirely remotely, the audio waveform and the video frames are transmitted to the remote server. Alternatively, some partial fingerprint processing may be done locally and then the remainder of the fingerprint processing may be done remotely. In this alternative embodiment, video frame selection on the video frames is performed locally on the mobile device and then only the selected video frames are transmitted to the remote server for fingerprint processing. For audio, the audio waveform may be re-sampled to a lower sampling rate and down mixed to one channel, before generating the fingerprints. Compression of the video frame and the audio samples may be used to reduce transmission costs.

At step 320, the audio fingerprints and video fingerprints are combined and a selected set of fingerprints are used as query fingerprints. Having both audio fingerprints and video fingerprints representing the TV programming content increases the reliability of TV content identification under severe audio and video signal degradations due to the surrounding ambient conditions. The resulting audio and video query fingerprints are transmitted to a search server. A search function may be either local, residing on the mobile device or remote, accessed for example through the Internet cloud. At step 322, the search server responds with a message that details where the audio and video content were found in the search database, and if found, the title of the content, the matching times, and related metadata, like an image representing the program, details about actors, or the like. If a match is not found at step 322, the process 300 returns to step 306 to select another fragment of media content for processing.

At step 324, the mobile application receives the match data and may be configured to trigger actions that are based on this data. Such actions may include displaying the identity of the content to the user, retrieving related information based on the identity of the content, allowing the user to register that piece of content with a registration server online, display an interactive ad based on the content and perhaps knowledge about the user, or may enable a variety of other real time applications based on detected audio and video content.

One embodiment of the invention addresses a method for improving the accuracy and speed of audio fingerprinting by using content based audio feature extraction and signature generation. Audio features, representing the audio content, are extracted by using a mel-frequency cepstrum coefficients (MFCC) algorithmic structure with an additional temporal multi-tap filtering of the output coefficients, and subsequent generation of compact, bit-wise representation of these features.

In another embodiment, an adapted MFCC algorithm makes use of central frequencies of filters in a filter bank that are adjusted according to a robust measure of a central or mean frequency of the input audio, such as the dominant frequency or spectral centroid. If this adapted MFCC algorithm is used for fingerprinting of both query and reference audio signals, the reference and query audio fingerprint comparisons can be made more robust to pitch changes in the query audio signal.

In general, implementation of an MFCC algorithm facilitates parametric spectral representation of audio signals, which allows for generation of multidimensional audio descriptors with a plurality of dimensions independent of the number of filter bands. Quantization of multidimensional audio descriptor coefficients, where each coefficient represents a descriptor dimension, secures precise bit-wise multidimensional audio signature generation for efficient database formation and search. These bit-wise multidimensional audio signatures can be efficiently deployed as primary audio content signatures in various application environments.

Input audio samples are divided into short, overlapping frames, and subsequently windowed with a particular windowing function to prevent artifacts in the output of an applied fast Fourier transform (FFT) due to the finite extent of time samples. The amount of the consecutive audio frame overlap is determined in accordance with the desired frequency in time with which audio descriptors are generated. Next, the FFT is computed for each overlapped, windowed, audio frame, and then the resulting high-resolution frequency spectrum is used as an input to a filter bank.

The filter bank may suitably be an MFCC filter bank with logarithmic spacing of center frequencies, or in a presently preferred embodiment, it can be adjusted according to a robust measure of the central or mean frequency of the input audio, such as the dominant frequency or spectral centroid.

For the case of an adjusted center frequency filter bank, a central frequency estimate from the spectral magnitude of the current audio frame is made. For example, with known default center frequencies of the MFCC filter bank filters, one of the filters in the filter bank is determined whose center frequency is closest to a central-frequency measure previously established. A multiplier factor is generated to scale this filter's center frequency to the central-frequency measure, and the other filters center frequencies are multiplied by this factor. The MFCC coefficients which are the amplitudes of the resulting spectrum are then computed in accordance with the adjusted filter bank.

In both cases, an advantageous logarithm of the output from each filter of the filter bank is computed to handle a wider range of volume levels. Alternatively or in addition to the logarithm computation, an advantageous square root (sqrt) of the output from each filter of the filter bank is computed to handle higher levels of noise. Then, a discrete cosine transform (DCT) is applied on the resulting signal to convert the log and/or the sqrt outputs from the filter bank to a new set of values and frequencies. Next, an advantageous multi-tap smoothing derivative finite impulse response (FIR) filter is applied in temporal domain on multiple audio descriptors which are outputs of the DCT stage of the computation computed in regular temporal intervals defined by the chosen amount of audio frame overlap. The multi-tap smoothing derivative FIR filter is applied in temporal domain separately on each audio descriptor coefficient, the DCT coefficient, to produce new, filtered DCT coefficients, representing a final multidimensional audio descriptor output.

Figure 4A:
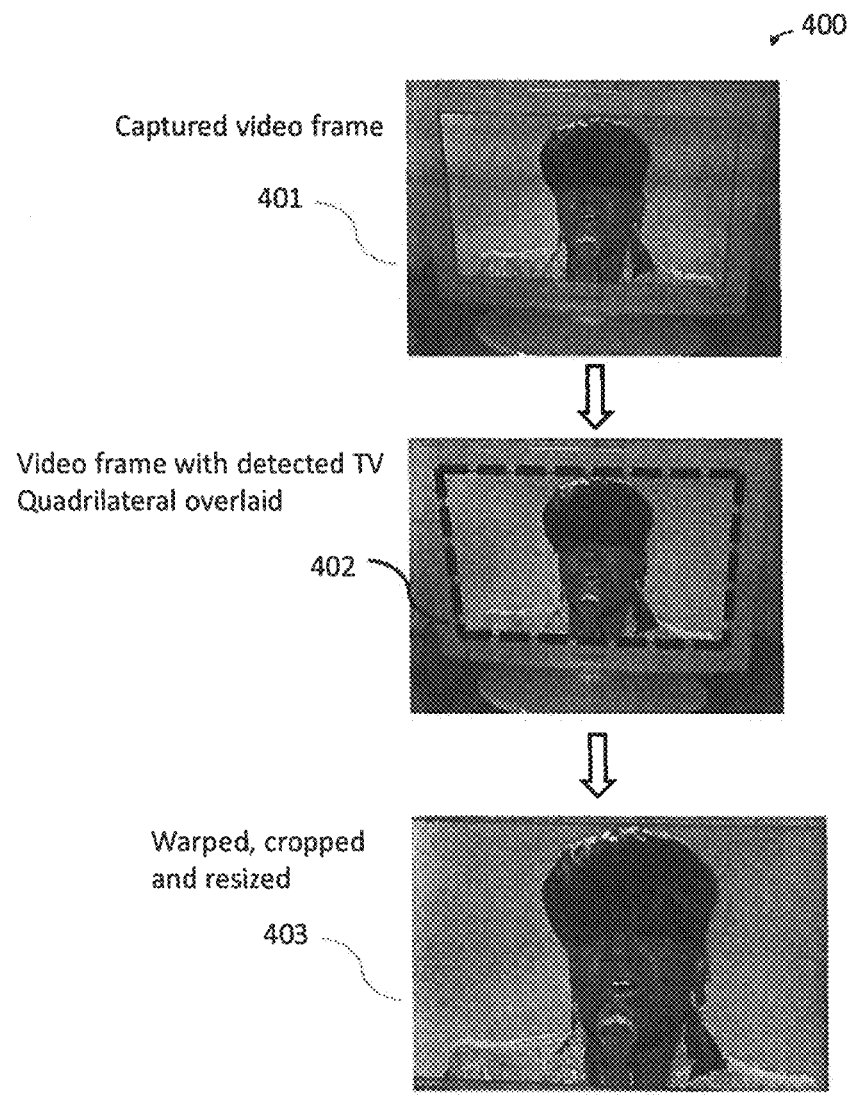
FIG. 4A illustrates a process for processing a video fragment acquired by a mobile camcorder operating on the smart phone.

FIG. 4A illustrates a process 400 for processing a video fragment, such as the frame captured in step 401, acquired by a mobile camcorder operating on the smart phone 110. A smartphone software application may be utilized to provide a fingerprinting and search function. Video frame 401 of the fragment is initially analyzed to identify a TV screen in the frame. In an exemplary case, the TV screen identification may be done by running edge detection on selected frames, by running corner detection on selected frames, and searching for an initial quadrilateral of appropriate dimensions as illustrated in step 402. A detected quadrilateral is further refined by tracking motion from frame to frame of pixel formations inside and in the immediate neighborhood of the quadrilateral. Also, brightness and color of the detected quadrilateral can be checked against the rest of a frame's content to further increase confidence that the TV screen area is correctly delineated. The frame area, corresponding to the detected quadrilateral, describing the TV screen active area is cropped and warped to an upright rectangle in step 403 and used for video fingerprint generation of the TV programming content captured from the TV set. The smartphone application generates query fingerprints for the acquired fragment of media content and transmits the query fingerprints to a search function. For example, a search query may be sent to a local search function operating on the mobile device or to a remote search server. The search function, either locally or remotely, searches for the query content in a reference database of the local mobile device and or an extensive reference database of the remote search server.

Figure 4B:
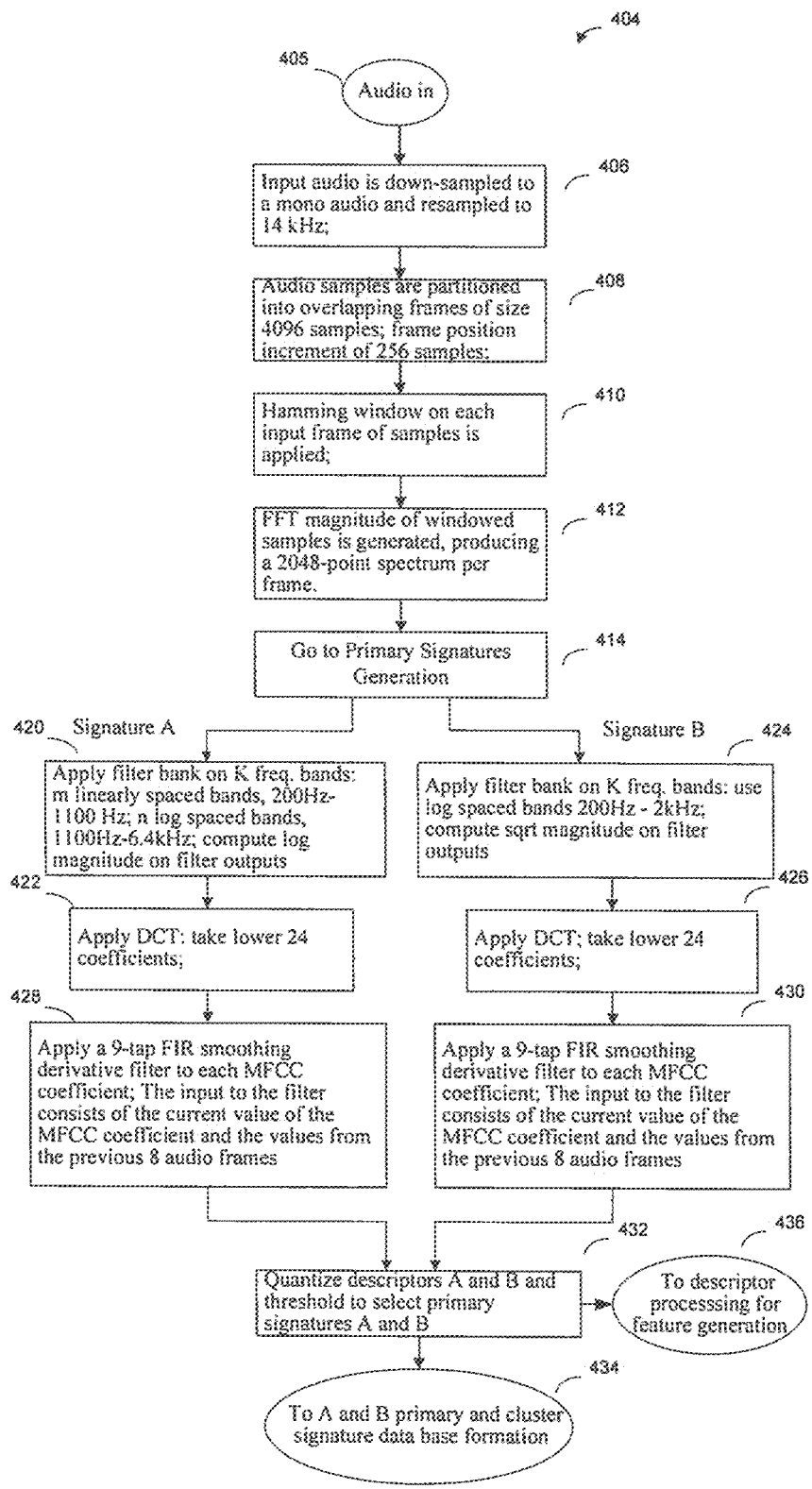
FIG. 4B illustrates a process for multiple primary audio signature generation.

FIG. 4B illustrates an exemplary and advantageous process 404 for multiple primary audio signature generation that targets mobile audio distortions. At step 405, captured audio samples are received for processing. At step 406, input audio is down-sampled to mono audio and resampled to 14 kHz. At step 408, the mono audio is partitioned into overlapping frames of size 4096 samples and a frame position increment is specified as 256 samples, for example, resulting in a frame overlap of 3840 samples. At step 410, a Hamming window is applied on each input frame of samples to reduce artifacts in FFT computation due to the finite length of the input signal. At step 412, an FFT magnitude of windowed samples is generated, producing a 2048-point spectrum per frame, the spectrogram.

At step 414, the exemplary process 404 continues on to primary signature A and signature B generation steps. Using the spectrogram, MFCC coefficients are generated and processed in steps 420-426 for the two distinct signatures A and B. At step 420, for signature A, a filter bank is applied on K frequency bands, such as K=24, producing K output coefficients divided into m linearly spaced bands across 200-1100 Hz, such as m=8, and n logarithmically spaced bands across 1100-6.4 kHz, such as n=16. Also, at step 420, a $\log_{10}$ magnitude on the filter bank outputs is computed. At step 422, a discrete cosine transform (DCT) is computed on the filter bank outputs to produce descriptor coefficients. At step 424, for signature B, a filter bank is applied on the same number K of frequency bands, producing K output coefficients logarithmically spaced across 200-2 kHz. Also, at step 424, a square root (sqrt) function is applied on the filter bank outputs to produce final filter bank outputs.

At step 426, a DCT is computed on the final filter bank outputs to produce descriptor coefficients. Next, at steps 428 and 430, final descriptors A and B are derived by applying in temporal domain a 9-tap finite impulse response (FIR) smoothing derivative filter to each dimension of 9 consecutive descriptors computed in regular intervals, for example in intervals of 256 audio samples. This filter is applied separately on the coefficients of the set of A descriptors and on the set of B descriptors. The input to each filter consists of the current value of the descriptor coefficient, which is also referred to as a dimension, and the corresponding coefficients, also referred to as dimensions, from descriptors for the previous 8 audio frames. A set of 9 FIR filter coefficients $\{h_0, h_1, h_2, h_3, h_4, h_5, h_6, h_7, h_8\}$ are designed to produce a smoothing derivative filter response for each descriptor coefficient or dimension. The filter coefficients are anti-symmetric, generated in the (−1, 1) interval.

At step 432, the descriptor coefficients are quantized to either 0 or 1 based on the coefficient sign. If the descriptor coefficient is greater than 0 a value of 1 is assigned to it, and if the descriptor coefficient is less than 0 a value of zero is assigned to it. The quantized values for each descriptor coefficient are concatenated together to produce a 24-bit signature. Signatures are then selected by choosing only signatures with at least k zeros and k ones, wherein k is a predetermined value. Signatures with fewer zeros or ones are suppressed. At step 434, filtered primary signatures A and B are output to the signature selection and database formation process 1123, as shown in FIG. 11B.

Figure 5:
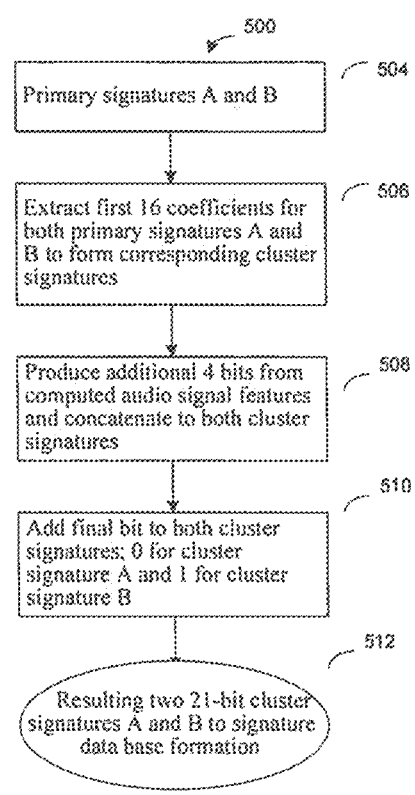
FIG. 5 illustrates a process for cluster signature generation.

FIG. 5 illustrates a process 500 for generation of audio cluster signatures, also known as traversal hash signatures. A number of lower coefficients of primary descriptors are extracted and then combined with additional bits from a set of independently detected audio content features to form the audio cluster signatures. At steps 504, primary signatures A and B are received as inputs to the process 500. At step 506, the lower 16 coefficients are extracted from both the primary signatures A and B producing two 16-bit signatures that are subsets of signatures A and B. At step 508, an additional 4 bits are produced for each subset of signatures A and B from selected additional audio features, as described in more detail below. The additional 4 audio feature signature bits are concatenated to their respective signatures A and B, resulting in two 20-bit cluster signatures. At step 510, a bit is added to both cluster signatures A and B; a 0 for cluster signature A and a 1 for cluster signature B. At step 512, two 21-bit cluster signatures are sent to signature selection and database formation process 1123 of FIG. 11B, with the exemplary data structure and signature format shown in FIG. 11A. The 21-bit cluster signature is used as an address for reference database partitioning into clusters of signatures. The 21-bit cluster signature address facilitates a fast access of content in the reference database during a content query and identification process. Selection of 16-bits from the primary signature, the four audio feature signature bits from generated audio features, and the formation of a 21-bit cluster signature as shown in the process 500 is exemplary. Other reasonable numbers of bits could be selected that in combination are less than the number of signature bits generated for the video frame 403, for example, such as the exemplary 24-bit primary signatures A and B generated at step 432 of FIG. 4B. It is noted that the exemplary 24-bit primary signatures A and B may be expanded by concatenating a number of feature bits resulting in 32-bit primary signatures, as described in more detail below. It is also noted that an alternative process may generate primary signatures A and B having for example 64-bits. In any of these cases, having 21-bit cluster signatures that are used as addresses facilitates a fast access of content in the reference database during a content query and identification process.

It is noted that in a controlled experimental environment, audio frames extracted from an audio signal are aligned to a multiple of frame step size, typically 256 or 512 samples, with a regular interval. However, in a real life dynamic environment, a starting point of the audio frames in the reference and query are generally randomly positioned with reference to each other. Hence, it would be advantageous if audio frames between the reference and the query signal are aligned based on some intrinsic audio signal features.

In another embodiment, audio signal onset detection in the time domain is used for audio frame alignment. Audio signal onset detection is an audio analysis technique that can be used to improve a fingerprinting system by aligning an audio signal fingerprinting window to an onset event. Onset events can also be used for feature signature or cluster signature bit generation, as well as for combining pairs of signatures based on distinct onset event times. If the same onsets are found on both the reference and the query audio signals, audio frames will be aligned to the same audio content on both the reference and the query signals. If a gap between detected onsets is larger than a frame step size, then additional audio frames can be generated with a regular interval relative to the onset. Also, by using audio frames when onsets are found, the number of audio signatures generated can be reduced.

Figure 6:
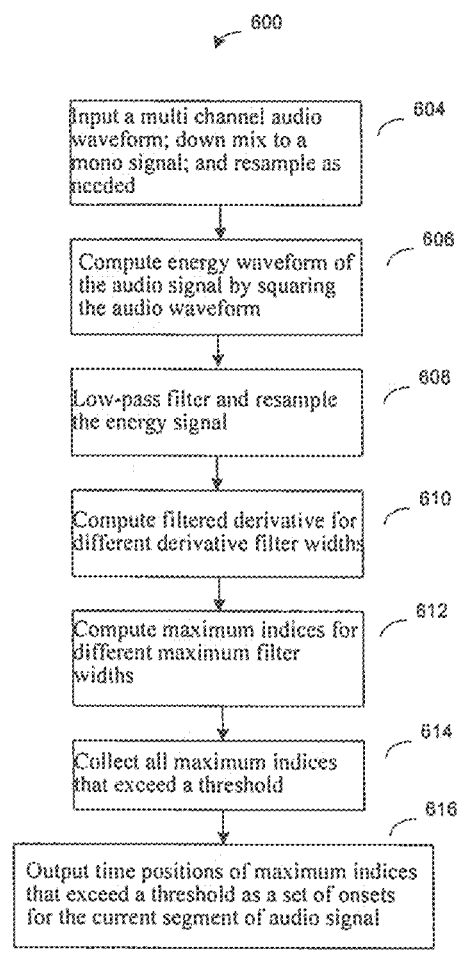
FIG. 6 illustrates a process for audio signal onset detection in the time domain.

FIG. 6 illustrates a process 600 for audio signal onset detection in the time domain. The process 600 is used to improve the audio fingerprinting and identification system, such as the system 100 of FIG. 1, by aligning audio signal fingerprinting windows to pronounced events intrinsic to the audio signal. The process 600 is a temporal process for onset detection that is precise and computationally efficient. At step 604, a multi-channel audio waveform is received and then down mixed to a mono signal, and resampled to a desired sampling rate. At step 606, an energy waveform of the audio signal is computed by squaring the resampled audio waveform. At step 608, a low-pass filter is applied to the energy waveform signal and resampled, for example to approximately 1 ms. At step 610, a filtered derivative of the resampled filtered energy waveform signal is computed for a multitude of derivative filter widths, to produce filtered derivative signals. Next, at step 612, maximum values of the filtered derivative signal are computed for a multitude of maximum filter widths. At step 614, maximum values that exceed a heuristic threshold are collected. At step 616, time positions of maximum values that exceed the threshold are output as a set of onsets for the current segment of audio signal.

The filtered derivatives of the low passed energy audio signal computed at step 610 represent a type of 1-D blob detector over the received audio waveform. By varying the derivative filter width at step 610 and the maximum filter width at step 612, audio signal onsets at different points in time are obtained.

Figure 7:
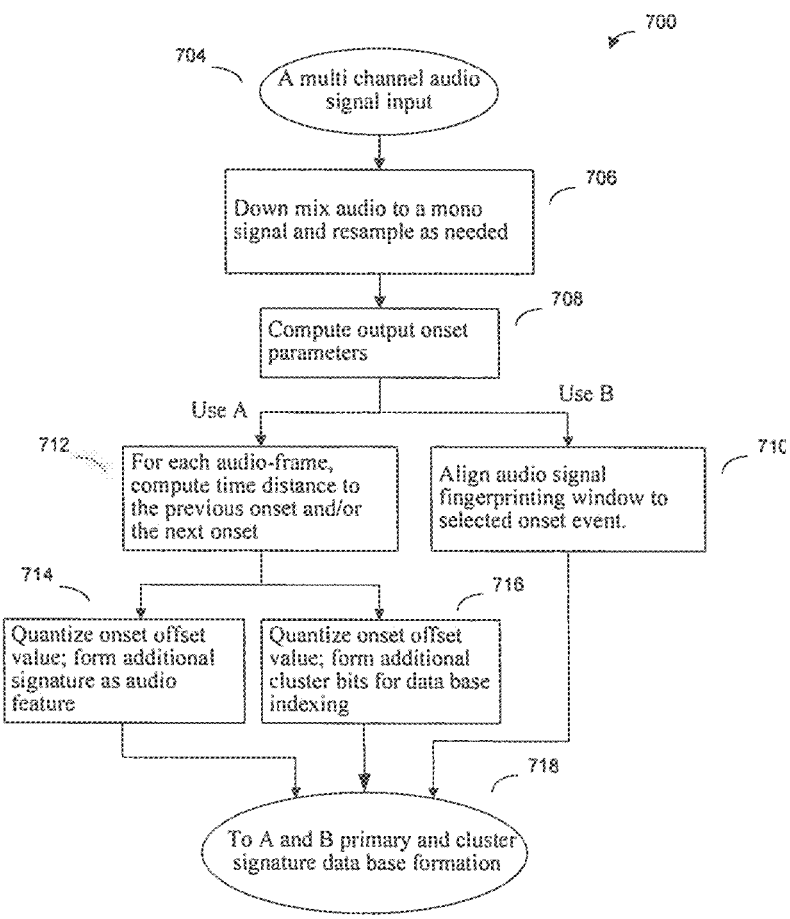
FIG. 7 illustrates a process for utilization of audio signal onset information.

FIG. 7 illustrates a process 700 for utilization of audio signal onset information. At step 704, a multichannel audio signal is received. In step 706, the multichannel audio signal is down mixed to a mono signal which is then resampled as needed. For example, the received audio signal may generally be sampled with 48 KHz or 44 KHz and the mono signal may be resampled to 14 KHz, however, the necessity of down sampling may be determined in a particular implementation. At step 708, output onset parameters are computed describing the time position of onset events and onset magnitudes. At step 710, an onset position is used to align an audio signal fingerprinting window to a selected onset event. At step 712, for each audio frame, the time distance to the previous onset, and separately to the next onset are computed. The combined time distance to the previous onset and to the next onset is termed an "onset-offset" value. At step 714, the onset-offset value is quantized to a k-bit value to be used as an independent feature signature in the search and correlation process for audio content identification. In step 716, the onset-offset value is quantized to an m-bit value to be used as additional bits concatenated to the cluster signatures. At step 718, the output from steps 710, 714, and 716 are collected and passed to signature A and signature B selection and database formation process 1123 of FIG. 11B.

Three exemplary embodiments for audio content feature extraction and feature signature generation are described next. A method for time domain audio frame onset detection is described with regard to FIG. 8, a method for frequency domain entropy computation for each audio frame is described with regard to FIG. 9, and a method for extraction of maximum difference in the output descriptor coefficients is described with regard to FIG. 10. The feature signatures, as described above, are used either independently during the correlation stage of the audio search and identification, or selected bits from the feature signatures are combined and concatenated with either primary or cluster signatures or both signatures to improve the uniqueness of primary and cluster signatures.

Figure 8:
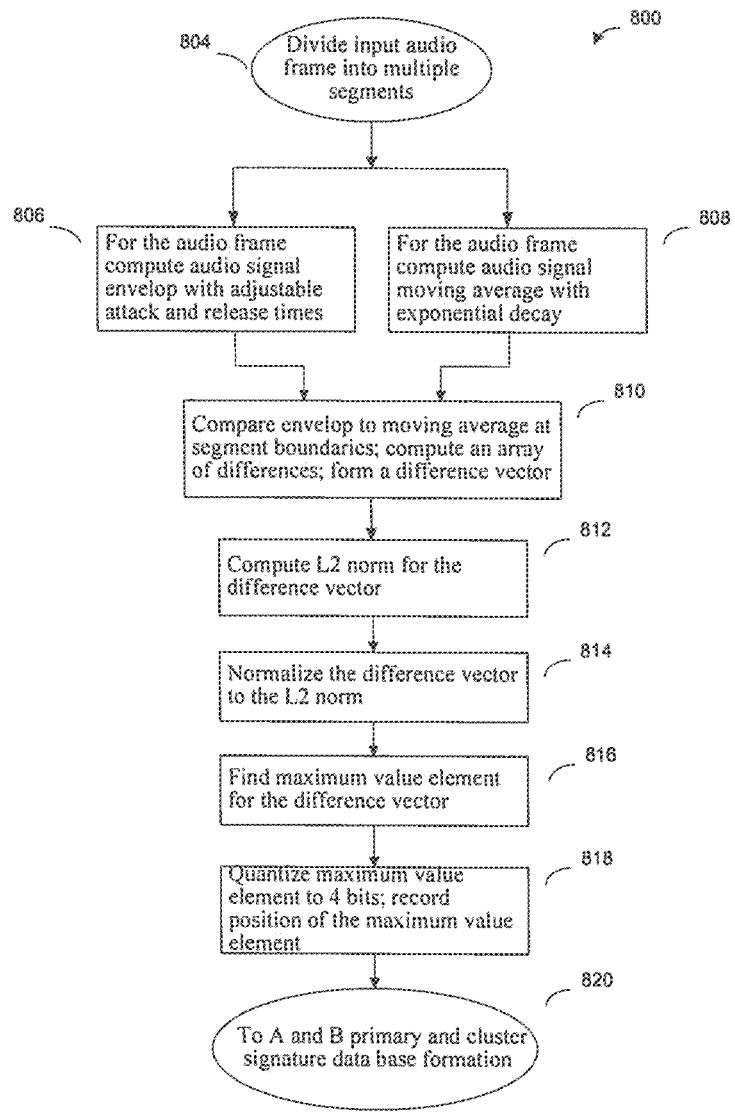
FIG. 8 illustrates a process for onset detection in the time domain based on audio frame envelope tracking and continuous moving average tracking as an audio frame feature.

FIG. 8 illustrates an exemplary process 800 for onset detection in the time domain based on audio frame envelope tracking and continuous moving average tracking. The array of onsets computed with this process for each audio frame can be used as an audio frame feature to be associated with the audio frame primary or cluster signature. At step 804, each audio frame received for processing is divided into 16 segments of 256 samples. At step 806, an audio signal envelope detector is used to trace an audio signal envelope. The envelope detector algorithm includes variable attack and release times that can be independently adjusted according to a desired sensitivity to audio signal content changes. For each audio frame, a value of the envelope is recorded at the end of each 256 sample segment. At step 808, a moving average with an exponential decay is computed continuously over the same audio frame. At step 810, at the end of each 256 sample segment, the envelope value determined at step 806 is compared to the moving average value determined at step 808, and a difference vector is generated at step 810. At step 812, the difference vector $L_2$ norm is computed. At step 814, the difference vector elements are normalized to the difference vector $L_2$ norm. At step 816, a maximum difference vector element is determined and normalized. At step 818, the normalized maximum difference vector element from step 816 is quantized to a 4 bit value and its position within the audio frame is recorded. At step 820, the normalized maximum difference vector element and its position are delivered as audio feature signatures to the signature selection and database formation process 1123 of FIG. 11B, with the exemplary signature data structure 1100 as shown in FIG. 11A.

Figure 9:
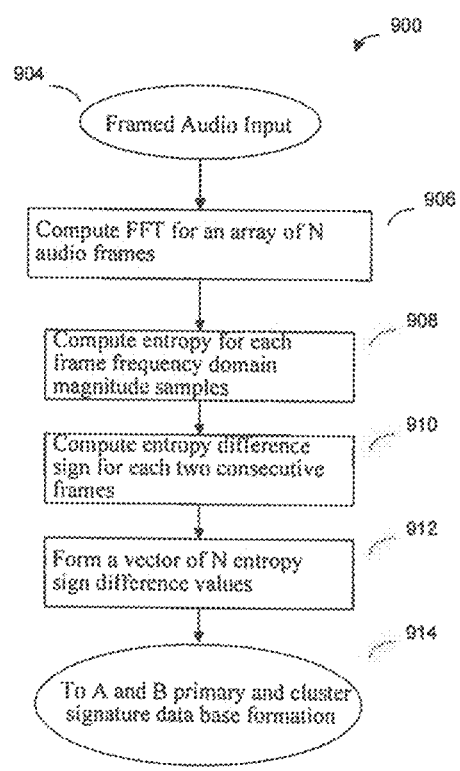
FIG. 9 illustrates a process for audio frame frequency domain entropy computation as an audio frame feature.

FIG. 9 illustrates a process 900 for an exemplary audio frame frequency domain entropy computation as an audio frame feature to be associated with the audio frame primary and cluster signatures. At step 904, audio frames are received for processing. At step 906, an FFT is computed for an array of N received audio frames. At step 908, a spectral magnitude of the FFT output from step 906 is used to compute an entropy function for spectral magnitude samples. An exemplary entropy function 908 may be computed as follows. If M(f) is the magnitude of the spectrum for frequency position f in a particular audio frame, then $M_s(f)$ is M(f) divided by the sum: sum(M(f)), computed for the audio frame. The spectral entropy is computed as a sum: sum{ $\log_2[M_s(f)]*M_s(f)$}, where the summation is taken over the range of frequencies in the audio frame. At step 910, a first temporal derivative of the entropy is computed for each two consecutive audio frames. This temporal derivative computation corresponds to computing a sign of an entropy change between two consecutive frames. At step 912, signs of the most recent N samples of the entropy difference values from step 910 are concatenated to form an N-bit entropy sign difference history feature vector. At step 914, the N bit history feature vector is delivered as a feature signature to the signature selection and database formation process 1123 of FIG. 11B, with the exemplary signature data structure 1100 as shown in FIG. 11A.

Figure 10:
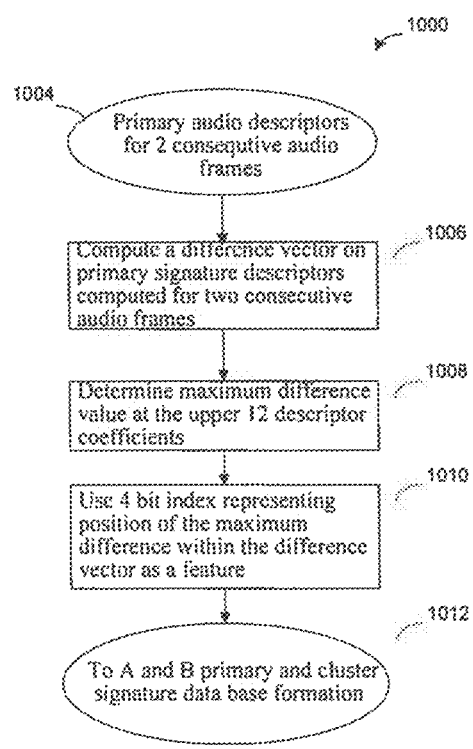
FIG. 10 illustrates a process to compute position of the maximum change in the audio descriptor coefficients between two consecutive audio frames, which is used as an audio frame feature.

FIG. 10 illustrates a process 1000 to compute an exemplary position of the maximum difference in the audio descriptor coefficients between two consecutive audio frames, to be associated with the audio frame primary or cluster signature as an audio frame feature. At step 1004, audio descriptors from step 436 of FIG. 4B for two consecutive audio frames are received for processing. At step 1006 and for each audio frame, a differential descriptor vector is computed. At step 1008, the largest magnitude difference in the upper X dimensions, such as the upper 12 dimensions as determined experimentally or by heuristic, of the descriptor is determined. At step 1010, a 4 bit value is determined as representing a position of the maximum difference within the X dimension differential descriptor vector. At step 1012, the positional index value is delivered as a feature signature to the signature selection and database formation process 1123 of FIG. 11B, with the exemplary signature data structure 1100 as shown in FIG. 11A.

Figure 11A:
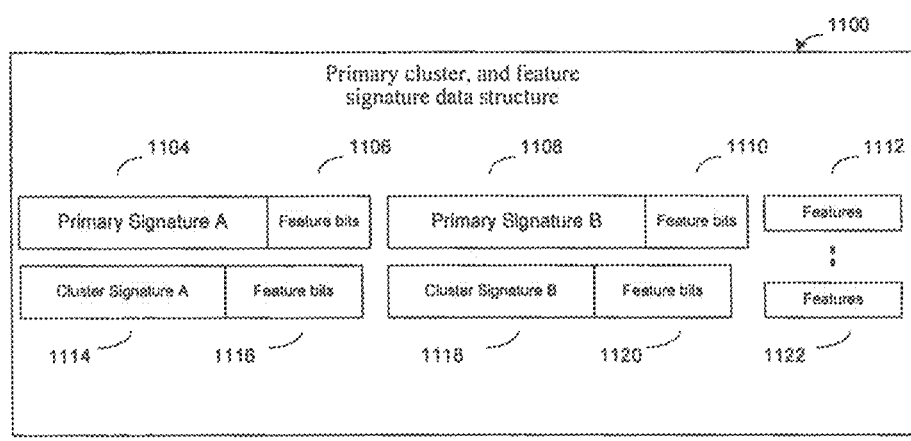
FIG. 11A illustrates an exemplary signature data structure used in a signature database.
Figure 11B:
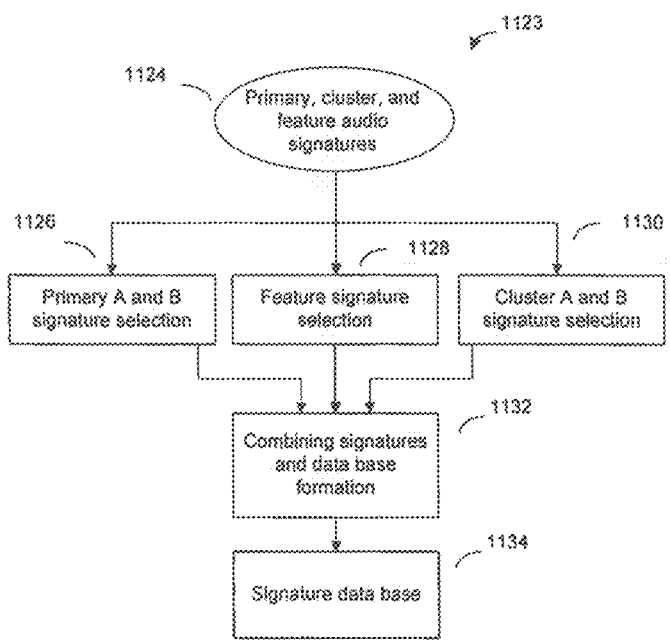
FIG. 11B illustrates a signature selection and database formation process.

FIG. 11A illustrates an exemplary audio-video signature data structure 1100. Block 1104 represents a primary signature A, such as an exemplary 24-bit value, which is concatenated with a feature aspect 1106, such as an exemplary 8-bit value, associated with the primary signature A. In a similar manner, block 1108 represents a primary signature B, such as an exemplary 24-bit value, which is concatenated with a feature aspect 1110, such as an exemplary 8-bit value, associated with the primary signature B. Blocks 1112 and 1122 represent p-bit additional features used during the correlation process of audio content search and identification to further differentiate matching results, where p may be an exemplary sixteen bit value. Also, feature bits may be added to the primary signature to increase the signature length. A similar data structure is formed for the cluster signature A, blocks 1114 and 1116, and cluster signature B, blocks 1118 and 1120.

As an example, additional q-bits in the cluster signatures may be formed as a mixture of selected bits from an onset feature, selected bits from an entropy feature, and selected bits from a maximum change in the descriptor coefficients feature. Block 1114 represents a cluster signature A, such as an exemplary 16-bit value, which is concatenated with a q-bit feature aspect block 1116 associated with the cluster signature A, where q may be an exemplary 5-bit value. In a similar manner, block 1118 represents a cluster signature B which is concatenated with a q-bit feature aspect block 1120 associated with the cluster signature B. Features, primary signatures, and cluster signatures are packed into the signature data structure as shown in FIG. 11A, and subsequently used for media search and identification, as described in more detail below.

As presented above, primary and cluster audio signatures are formed as a mixture of bits, representing dimensions of the associated signatures, selected from the MFCC filtered output, and additional audio features bits. Both combined K-dimension primary signature and combined M-dimension cluster signature are generated for each audio feature identified in a set of reference multimedia clips. Similarly, exemplary L-dimension video primary signatures and N-dimension video cluster signatures, as well as x, y, and scale feature signatures, are formed as described in U.S. Pat. No. 8,189,945 titled "Digital Video Content Fingerprinting Based on Scale Invariant Interest Region Detection with an Array of Anisotropic Filters" and U.S. Pat. No. 8,195,689 titled "Media Fingerprinting and Identification System" which are hereby incorporated by reference in their entirety.

An exemplary first audio and video fingerprinting process would include multiple video signatures generated on an active TV area as shown in the processed video frame in step 403 of FIG. 4A, onset detection for audio fingerprint alignment, such as the onset detection process 600 of FIG. 6, multiple primary audio signatures generated in process 404 of FIG. 4B, multiple audio cluster signatures generated in process 500 of FIG. 5, and feature signatures generated in processes 800 of FIG. 8, 900 of FIG. 9, and 1000 of FIG. 10. The signatures in steps 432, 510, 818, 912, and 1010, are advantageously combined in the signature selection and data base formation process 1123 of FIG. 11B. It is noted that the feature signatures from steps 818, 912, and 1010 may be suitably combined by concatenation or by another combinational method to generate a combined feature signature.

In another exemplary case, a second audio and video fingerprinting process would include onset detection for audio fingerprint alignment 600, multiple primary audio signatures generated in process 404, multiple audio cluster signatures generated in process 500, and feature signatures generated in process 700. The signatures in steps 434, 512, 714, and 716 would be combined in the signature selection and database formation process 1123 of FIG. 11B.

It is noted that multiple exemplary combinations of signatures generated, as illustrated in FIGS. 4A, 4B, 5, 6, 7, 8, 9, and 10, selection, and data base formation processes may be used. An experimental analysis may be used together with application requirements to select or adapt the signature generation process most appropriate for a given situation.

Each K(L)-dimension signature and a link to a corresponding reference multimedia clip are stored at a location in a reference signature database residing either on the remote server or in storage on the local mobile device. Each location is addressable by the M(N)-dimension cluster signature, also described as a traversal hash signature. A K(L)-dimension query signature and an M(N)-dimension query cluster signature are generated for a query multimedia clip. The reference signature database is searched using the query cluster signature to find similar signatures that are within a specified signature distance, wherein the similar reference multimedia clips are aggregated in a candidate list of closely matching signatures that correspond to similar reference multimedia clips. Additional feature signatures may also be used for media query and reference signature correlation to strengthen the scoring process and reduce false positive media identification.

FIG. 11B illustrates a signature selection and database formation process 1123. In step 1124, the primary, cluster, and feature signatures are received. In step 1126, primary signatures A and primary signature B are selected based on multiple criteria related to a particular application requirement. In step 1128, feature signatures are selected to form associated feature signatures. For example, the selection may be dependent on general computational requirements and the database size limitation. In step 1130 cluster signatures A and B are selected based on the reference signature data base size, the required query response time, and the required query precision and recall. In step 1132, the set of primary, cluster, and feature signatures from steps 1126, 1128, and 1130 are combined and then used to form an audio signature database in step 1134 with the exemplary signature data structure 1100 shown in FIG. 11A.

Figure 12:
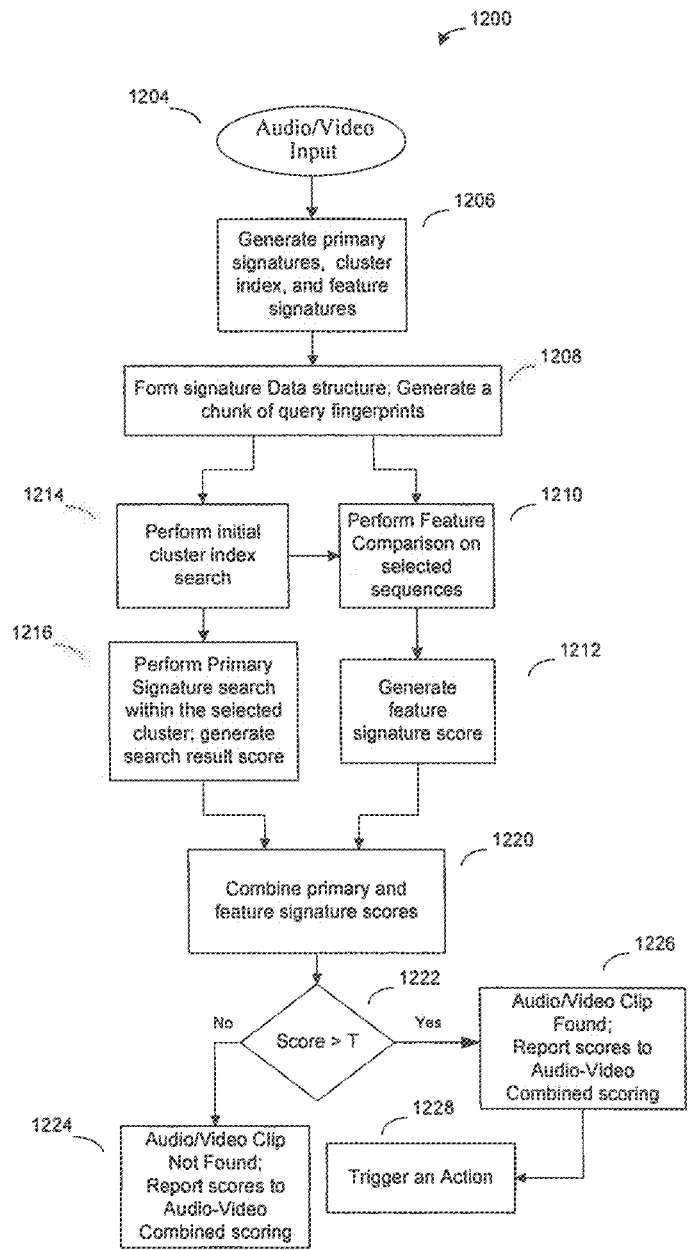
FIG. 12 illustrates a process for fingerprinting and searching with multiple signatures and features.

FIG. 12 illustrates a process 1200 for fingerprinting and search with multiple signatures and features. For example, multiple signatures and features may be derived from TV program video content. In the process 1200 of FIG. 12, it is assumed that the reference database has been formed in advance by use of a fingerprinting process, such as incorporated in the database formation process 1123 of FIG. 11B. At step 1204, a query audio signal, or a query video signal, or combined audio and video query signals are submitted for fingerprinting. At step 1206, primary, cluster and feature query signatures are generated. At step 1208, query signatures are generated for a chunk of query content, usually 5-10 seconds worth of query fingerprints, and subsequently used for content identification. At step 1214, a cluster search is performed to determine a reference signature cluster closest to the query cluster signature. At step 1216, a similarity search is conducted with the query primary signature on the primary signatures belonging to the identified cluster. Search result scores are generated at step 1216 and matching candidates from the reference content are identified. At step 1210, query feature signatures are compared to the reference feature signatures for all candidates belonging to the identified cluster, and at step 1212, a feature score is generated. At step 1220, primary and feature signature scores are combined for all candidate matches. At step 1222, the resulting score is compared against a threshold T. If a matching reference audio score is above the threshold T, the process 1200 proceeds to step 1226 where notification is presented of a successful search result. At step 1228, a software application which can perform actions that are synchronized to the video content are triggered. If all candidate matching scores are below the threshold T, the process 1200 proceeds to step 1224 where notification is presented of a not found result. The threshold T, used for signature and feature comparison score evaluation, may be heuristically generated or generated based on a training process on an extensive training database.

Figure 13:
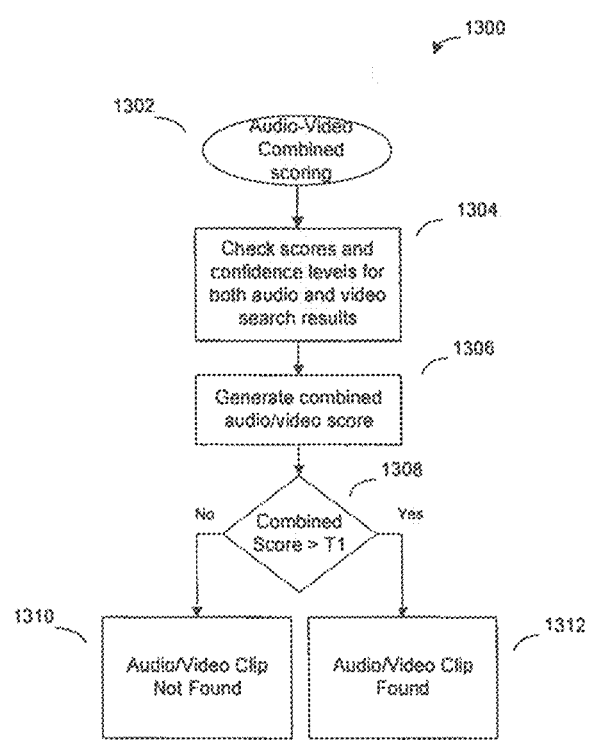
FIG. 13 illustrates a process for combining audio and video data base search results to refine the search process and improve accuracy in finding a matching audio/video sequence.

FIG. 13 illustrates a process 1300 for combining audio and video data base search results as generated in the process 1200 to refine the search process and improve accuracy in finding a matching audio and video sequence.

The audio and video database search results, such as a set of scores for candidate matching audio and matching video sequences, are combined and further analyzed in the steps of process 1300 of FIG. 13. At step 1302, audio and video scores are received for a combined analysis. At step 1304, search result scores and computed confidence levels for both audio and video search results are analyzed on multiple reported, in other words identified, top candidate audio and video titles. At step 1306, a combined audio and video score is generated. In step 1308, the combined audio and video score is tested against a threshold T1. If the combined score is below the threshold T1, an audio and video sequence not found result is reported at step 1310. If the combined score is greater than the threshold T1, an audio and video sequence found result is reported at step 1312.

A method is presented for efficient and accurate actionable television event identification based on television audio-video content fingerprinting following various viewing scenarios in the broadcast and cable television transmission environment. An actionable media event is an event that is suitable to be acted on. Based on a detected actionable event in a local set top box (STB) or properly equipped television set with broadband connection, an enhanced television viewing functionality is delivered via MSO installed equipment on top of current linear television transmission services. In one scenario, when a TV program is viewed, contiguous segments of played video are collected in real time, fingerprinted, and subsequently used as queries into a locally preloaded reference fingerprint database representing a collection of known advertising clips. A successful ad identification is used as an actionable event, triggering various additional local advertising and/or various enhancement programming made available to the user.

In another scenario, a query video clip such as an ad, or a part of a television program, is fingerprinted in a remote location and subsequently delivered through the Internet network to a local STB or properly equipped TV set. Remotely delivered query fingerprints are used to identify timely reference content of played television programs collected locally within an STB or a properly equipped TV set with broadband connectivity. Fingerprinted reference television content is stored on a push down stack within an STB or properly equipped TV set, and is continuously refreshed with new television content. This scenario is used for fine granularity, fast verification of ads or other television programming, presented to viewers within a period of time equivalent to the duration of the locally collected TV programming. Fast detailed audience measurements concerning a particular television program may be generated based on snippets, short clips, of remotely delivered query television content fingerprints, subsequently identified at a locally generated short, timely reference database of fingerprinted television content.

The system presented here includes a localized preloaded ad reference database, collected in a real time television content reference database, remote and local query generation, near real time remote and local query responses, and scalability across a multitude of devices from mobile phones and TV STBs to TV sets upgraded with Internet protocol (IP) connectivity. The system as described herein sets itself apart from other systems in terms of accuracy, scale, and speed. Locally accumulated, limited amount of played television content stored in a push down stack in a local memory device, for example, allows for detection of a played advertisement or other content by means of a remotely delivered advertisement query or other content query. It also allows querying a reference database locally preloaded with fingerprinted ads of choice, with fingerprinted short real time sequences of television content, and in a fraction of the ad duration, leading to subsequent changes in user device activity, including a coherent system of discovery, recommendation and new ad insertion.

Audio and video content fingerprinting for actionable television programming detection and identification presented herein provides for managing content identification and detecting actionable events with high accuracy, simultaneously allowing for low cost design and easy system upgrades. A service that provides a seamless and coherent enhanced user experience generally should also be based on accurate information about the viewer's activity. The existing relationship between customers and MSOs and satellite connection providers creates a tremendous advantage in using innovative technology to allow viewers the freedom of exploring new possibilities, while maintaining the existing services of MSOs and satellite connection providers. Also, a standardized user interface may be created to reliably identify a wide variety of video clips such as ads and other programming content within predetermined time periods when actionable events may be detected.

The potential of interactive, actionable TV may be achieved by having an accurate identification of played content at the granularity of small video-audio clips, such as ads and excerpts from the played content.

As used herein, a video fingerprint is a calculated numerical value, alternatively described as a video signature, which represents a prominent feature of a video frame. A collection of signatures drawn from a single video frame with multiple features generates a compact video frame representation. A collection of signatures associated with multiple video frames in a video sequence forms a video sequence representation. In addition, an audio fingerprint is a calculated numerical value, alternatively termed an audio signature, which represents a prominent feature of an audio frame. An audio frame is a collection of audio samples within a time window covering a portion of an audio sequence. A collection of audio signatures associated with audio frames in an audio sequence with multiple frames forms an audio sequence representation.

Video fingerprints are designed for a particular type of utilization, supporting invariance to various video production processing effects such as aspect ratio conversion, including 16×9 to 4×3 letterbox, or 4×3 to 16×9 conversion, cross conversion between 720p and 1080i, up-down conversion from high definition (HD) to standard definition (SD), a percentage of brightness and contrast change, various compression techniques, and the like.

Audio fingerprints are designed to be robust to level changes such that different audio levels have minimal effect on the audio signature and changes, such as stereo to mono down mix, 5.1 channel down mix to stereo, various encoding or decoding processes such as MPEG, Dolby-x, MP3, various other distortions, such as speed up or 5 slow down, pitch change, gain change, noise, or the like.

The system architecture is based on a distributed audio and video fingerprint generation with a centralized or distributed monitoring and control functions. Two separate reference fingerprint databases are maintained. One set of reference television program content fingerprints are generated at a distributed array of STBs or Internet protocol (IP) equipped television sets located at viewers' premises. For this case, a reference fingerprinting process continuously fingerprints current TV content and subsequently refreshes a local reference fingerprint revolving buffer of programmable length according to a predetermined, programmable schedule. In addition to reference fingerprints, relevant metadata, such as program title, program length, close captioning, 15 current date, and the like, associated with the fingerprinted TV content are recorded. The reference database generated and refreshed as described above is termed a reference television (ReferenceTV) database.

In another scenario, a set of reference fingerprints of selected video sequences are transferred to a distributed array of client media devices, such as an array of STBs or equipped television sets, to form a reference database that is stored locally on each client media device. The selected video sequences may include a collection of currently relevant advertising clips, which may be audio advertisement clips or video advertisement clips. The reference database on each client media device is termed a reference advertisement (ReferenceAD) database.

In one embodiment of this invention, query fingerprints, representing short known media sequences, such as advertising clips that are generally the beginning frames of an advertisement, may be generated at a remote location and transferred to selected client media devices. A client media device may be a digital radio, an IP equipped TV, a set top box, a network attached game machine device, or the like. The query fingerprints may also be broadcast to an array of client media devices, such as STBs and IP equipped television sets, or to a part of the array of STBs and IP equipped television sets over a TCP/IP network, for example. The query fingerprints representing multiple different known media sequences may be received into a local query buffer of the client media device. The received query fingerprints are then periodically used to search the current content of the reference media database, such as the ReferenceTV fingerprint database stored, for example in a ReferenceTV revolving buffer. A successful video clip identification is used as an actionable event, triggering various additional local advertising and various enhancement programming made available to the user. For example, enhancement programming may include information on a previously viewed or currently viewed media selection in addition to what the media selection generally provides, such as release dates, characters in a video sequence, title of an audio sequence, links to additional information, related media content, and the like. Remote query content fingerprinting, packetizing and delivery scheduling may be different for different segments of the array of STBs and equipped television sets and may be tailored to the target client media devices.

In another embodiment of this invention, short contiguous snippets of currently played television program advertisements are collected and fingerprinted in real time, and subsequently used as queries into a locally preloaded ReferenceAD fingerprint data base representing a collection of relevant advertising clips. A successful ad identification is used as an actionable event, triggering various additional local advertising and various enhancement programming made available to the user. The ReferenceAD database is updated according to a location of the client media device and time of day of playing media content. For example, the ReferenceAD database may be updated with one set of advertisement fingerprints for advertisements shown in the morning and a different set of advertisement fingerprints for advertisements shown in the evening. Also, the advertisements shown in a western state may be different than an advertisement shown in an eastern state, with the client devices in each location updated with the appropriate local advertisement fingerprints.

Figure 14:
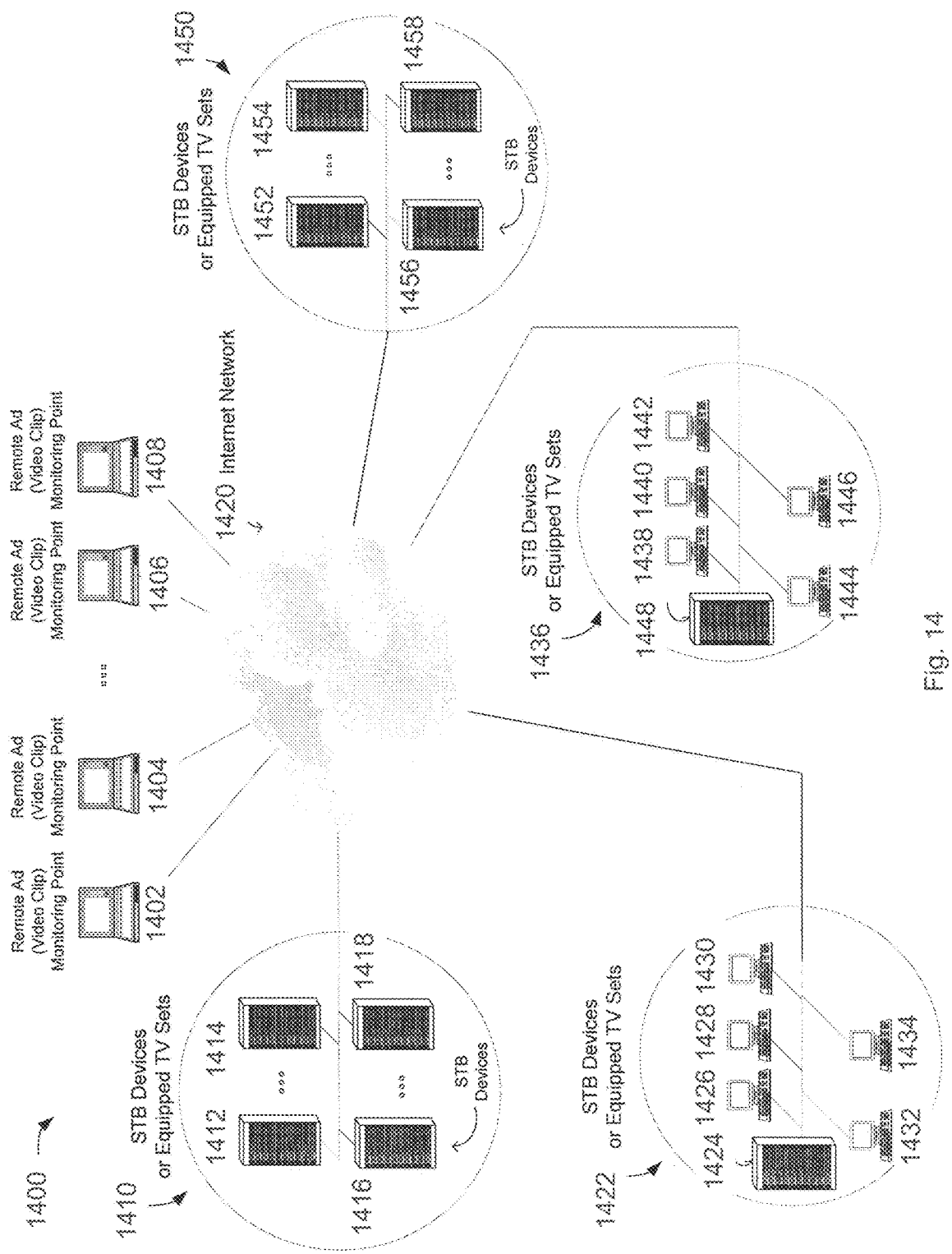
FIG. 14 illustrates a system for actionable event detection in accordance with an embodiment of the present invention.

FIG. 14 illustrates a system 1400 for distributed television content audio-video fingerprinting with a localized or distributed monitoring point, and a distributed array of STBs and IP equipped television sets 1410, 1450, 1422, 1436, in accordance with an embodiment of the present invention. As shown in FIG. 14, one aspect of the process of actionable event generation based on television program audio and video content fingerprinting consists of generation of query video clip fingerprints at a remote location, such as remote locations 1402-1408. The generated query fingerprints are transferred over a network, such as the Internet 1420, to an array of STBs 1412, 1414, 1416, 1418, 1424, 1448, 1452, 1454, 1456, 1458 and IP equipped television sets 1426-1434, 1438-1446. Each of the STBs and IP TVs subsequently monitors, detects and identifies reference television content corresponding to a query content. In another aspect of the system presented in FIG. 1, query fingerprints may be preloaded over the Internet 1420 into a local STB 1412, 1414, 1416, 1418, 1424, 1448, 1452, 1454, 1456, 1458 or an IP equipped television set 1426-1434, 1438-1446 and then used continuously or periodically for detection and identification of the reference television content corresponding to one or more of preloaded query contents. Access to the array of STBs 1412, 1414, 1416, 1418, 1424, 1448, 1452, 1454, 1456, 1458 and IP equipped television sets 1426-1434, 1438-1446 through the Internet 1420 is also utilized to preload a ReferenceAD 1516 database shown in FIG. 15.

Television content, part of the television content, and an ad are identified by a local correlation process which compares reference fingerprints, contained in a reference fingerprint database, such as the ReferenceTV database 1514, to query fingerprints loaded from the Internet 1420 into an STB or an IP equipped television set 1426-1434, 1438-1446. Also, query fingerprints selected from a local query buffer residing in an STB 1412, 1414, 1416, 1418, 1424, 1448, 1452, 1454, 1456, 1458 or an IP equipped television set 1426-1434, 1438-1446 may be compared to the ReferenceTV database 1514 of FIG. 15 to identify television content, part of the television content, an ad or a part of an ad. If query fingerprints match played reference television content fingerprints, a trigger point is generated to the application interface, prompting further actions handled by the application interface.

Figure 15:
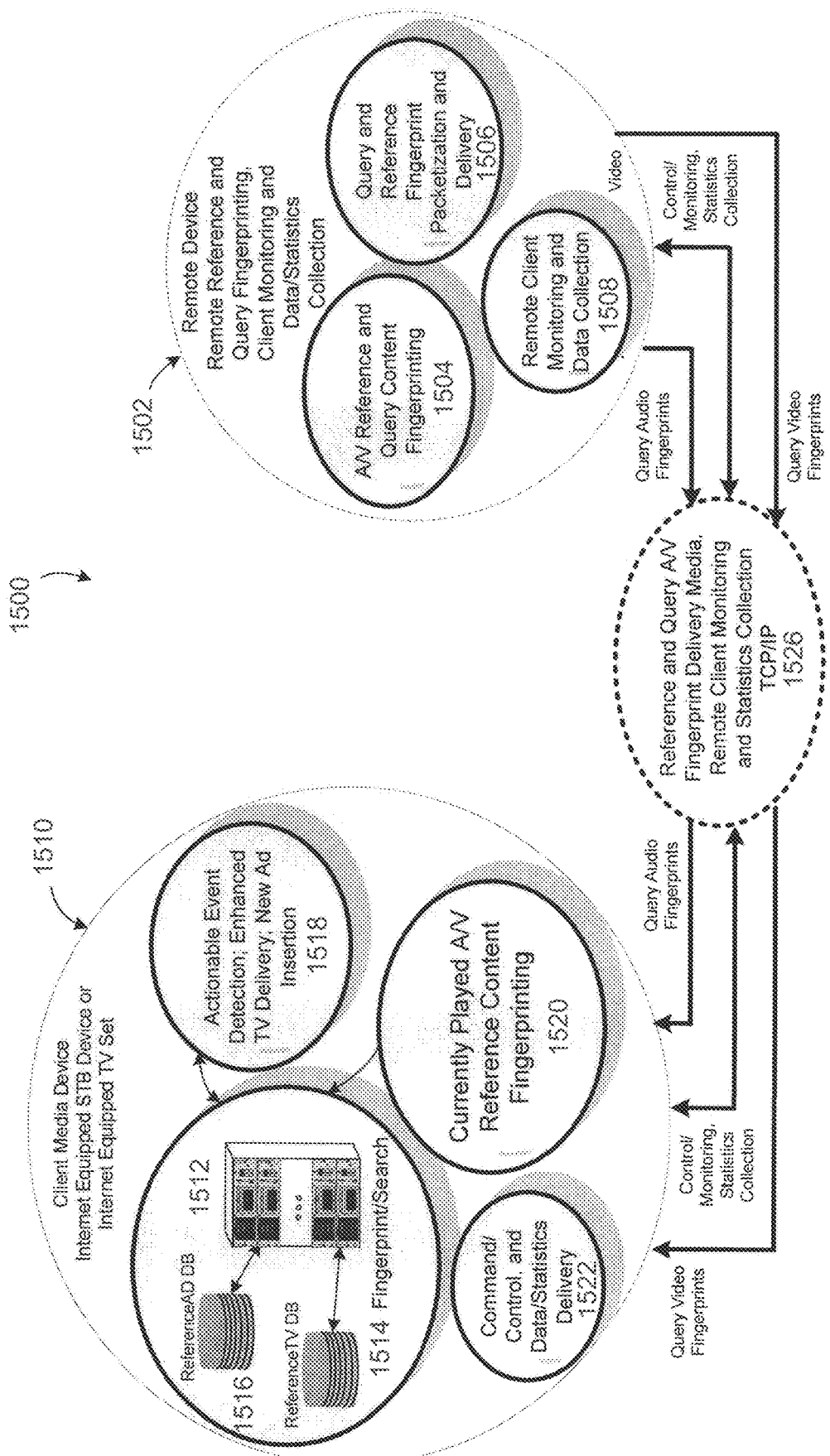
FIG. 15 illustrates a system view of a reference point with a multiple system operators device, satellite device, and Internet protocol (IP) equipped TV set, and a remote monitoring point in accordance with an embodiment of the present invention.

In another scenario, an ad is identified by a local correlation process which compares reference fingerprints, contained in the preloaded ReferenceAD database 1516 of FIG. 15, to query fingerprints generated from short contiguous snippets of played television content that are temporarily saved and fingerprinted in real time. Successful ad identification is used as an actionable event that is passed through a local application interface to an application that manages various additional local advertising and various enhancement programming.

FIG. 15 presents a system view 1500 of a reference point with a client media device 1510, such as an MSO device, satellite STB device, an IP equipped television set, or a remote device 1502, in accordance with an embodiment of the present invention. The system 1500 generates and delivers query fingerprints over a TCP/IP network using a media communication device 1526. The client media device 1510 contains ReferenceTV database 1514 and ReferenceAD database 1516, actionable event detection utility 1518, currently played audio and video reference content fingerprinting utilities 1520, and command, control, data and statistics preparation, and delivery utility 1522.

The remote device 1502 may also be suitably employed as a remote reference and query fingerprinting, client monitoring and data or statistics collection unit. The remote device 1502 contains functions for audio and video content fingerprinting 1504, query and reference fingerprint packetization and delivery 1506, and remote client monitoring and data collection 1508. The remote device 1502 delivers reference and query fingerprints to the remote clients, monitors client devices and collects data and statistics from the client media devices 1510.

The media communication device 1526 provides an interface between the client media device 1510 and the remote device 1502. For example, the media communication device 1526 may include a reference and query audio-video (A\N) fingerprint delivery media function and a remote client monitoring and statistics collection function for communicating with the client media devices through a network, such as the Internet, by using a communication protocol, such as the TCP/IP protocol.

An exemplary embodiment of signature formation, also referred to as fingerprinting, and database formation is described in U.S. application Ser. No. 12/141,163 filed Jun.

18, 2008, FIGS. 11-16 and page 25, line 3 to page 28, line 18. Another exemplary embodiment of fingerprinting and database formation is described in U.S. application Ser. No. 12/612,729 filed Nov. 5, 2009, FIGS. 12-14 and page 28, line 20 to page 31, line 13. Another exemplary embodiment of fingerprinting and database formation is described in U.S. application Ser. No. 12/491,896 filed Jun. 25, 2009, FIGS. 8-10 and page 20, line 8 to page 24, line 22. Another exemplary embodiment of fingerprinting and database formation is described in U.S. application Ser. No. 10 12/772, 566 filed May 3, 2010, FIGS. 4-9B and page 23, line 6 to page 40, line 6. A further exemplary embodiment of fingerprinting and database formation is described in U.S. application Ser. No. 12/955,416 filed Nov. 29, 2010, FIGS. 6-12, and page 16, line 8 to page 29, line 15. An exemplary embodiment of a system and database formation process is described in U.S. application Ser. No. 12/772,566 filed May 3, 2010, FIGS. 1-3, and page 10, line 10 to page 23, line 5. An exemplary embodiment of query search is described in U.S. application Ser. No. 12/141,163 filed Jun. 18, 2008, FIG. 17, and page 28, line 19 to page 29, line 6. Another exemplary embodiment of query search is described in U.S. application Ser. No. 12/612,729 filed Nov. 5, 2009, FIG. 15, and page 31, line 14 to page 32, line 15. A further exemplary embodiment of query search is described in U.S. application Ser. No. 12/772,566 filed May 3, 2010, FIGS. 10-13, and page 40, line 7 to page 45, line 14. Modifications of the above illustrative approaches or other approaches may be employed consistent with the teachings of the present invention.

Figure 16:
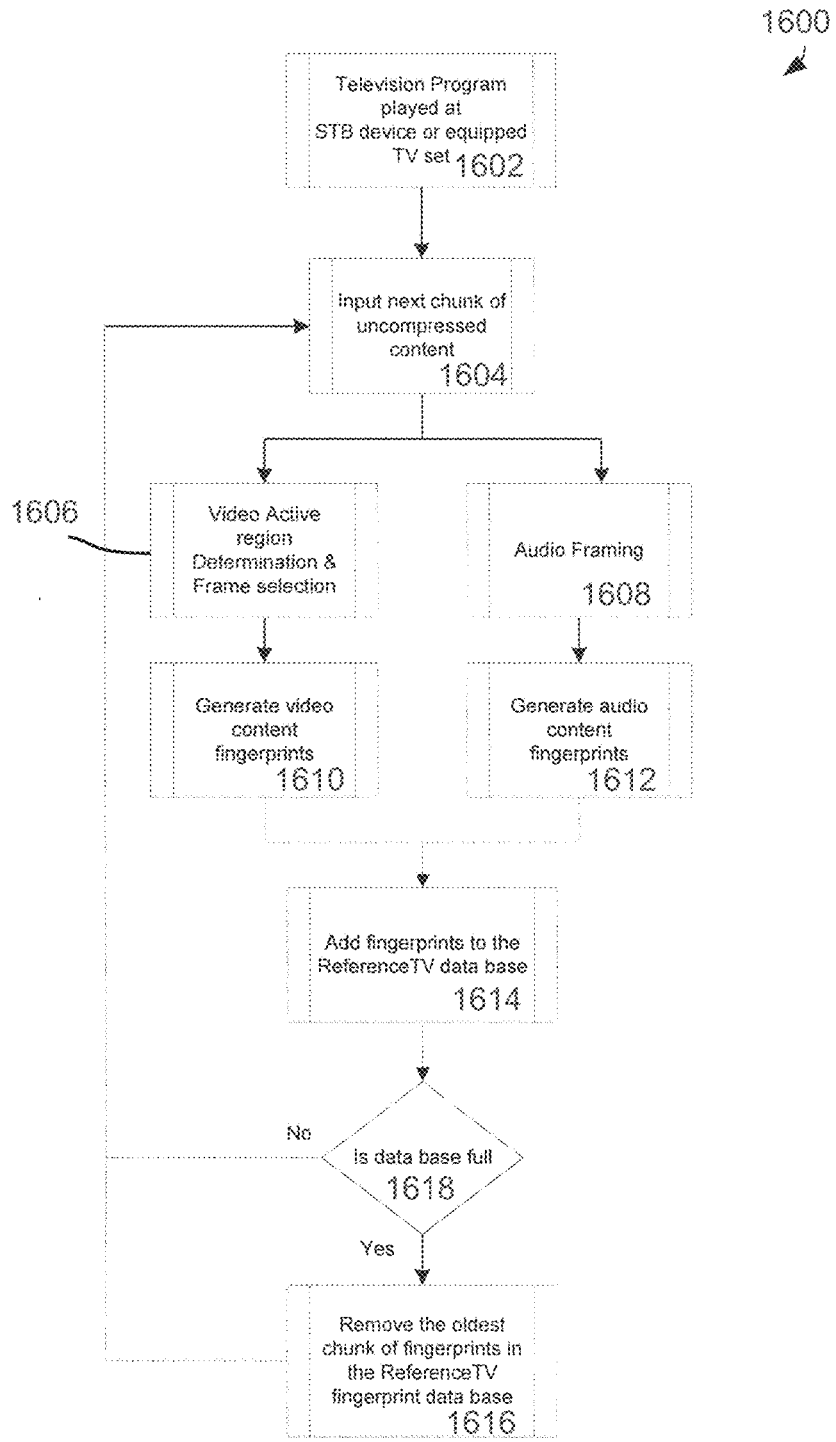
FIG. 16 illustrates a process for audio and video fingerprinting at client devices such as an STB, and an IP TV set, and reference television content database formation in accordance with an embodiment of the present invention.

FIG. 16 illustrates a process 1600 for audio and video fingerprinting at client devices such as an STB or an IP TV set, and reference television content database formation in accordance with an embodiment of the present invention. In FIG. 16, real time television content audio and video fingerprinting is accomplished at the client media device 1510, and used to form a subsequent audio and video ReferenceTV fingerprint database 1514. Reference television programming content, representing chunks of original material, is fingerprinted on the fly, while the television programming content is being presented to the viewer. A number of chunks of the current reference television content fingerprints are stored on a push down stack, thus forming the ReferenceTV data base 214. The Reference TV database 1514 is continuously refreshed with new chunks of fingerprints derived from the currently playing television programming content while the oldest chunks are removed from the database.

In FIG. 16 the process 1600 starts with a television program, played at an STB device or Internet protocol (IP) equipped TV set at step 1602. The original content is broken into contiguous, or noncontiguous, input chunks of uncompressed content at step 1604 for further processing. The input program content chunks from step 1604 are processed in step 1606 for video active region of interest determination and frame selection. The input chunks from step 1604 are also processed in step 1608 as well for audio framing into predetermined segment sizes. Next and in parallel, video content fingerprints are generated in step 1610, and audio content fingerprints are generated in step 1612. In step 1614, audio and video fingerprints are added to the ReferenceTV database 1514. In step 1616, a determination is made whether the ReferenceTV database 1514 is full. If the ReferenceTV database 1514 is full, the oldest chunk of fingerprints are removed from the ReferenceTV fingerprint database 1514 at step 1618 to make sufficient room for newly generated fingerprints. The process 1600 then returns to step 1604. Returning to step 1616, if the ReferenceTV database 1514 is not full, the process 1600 returns to step 1604.

Figure 17:
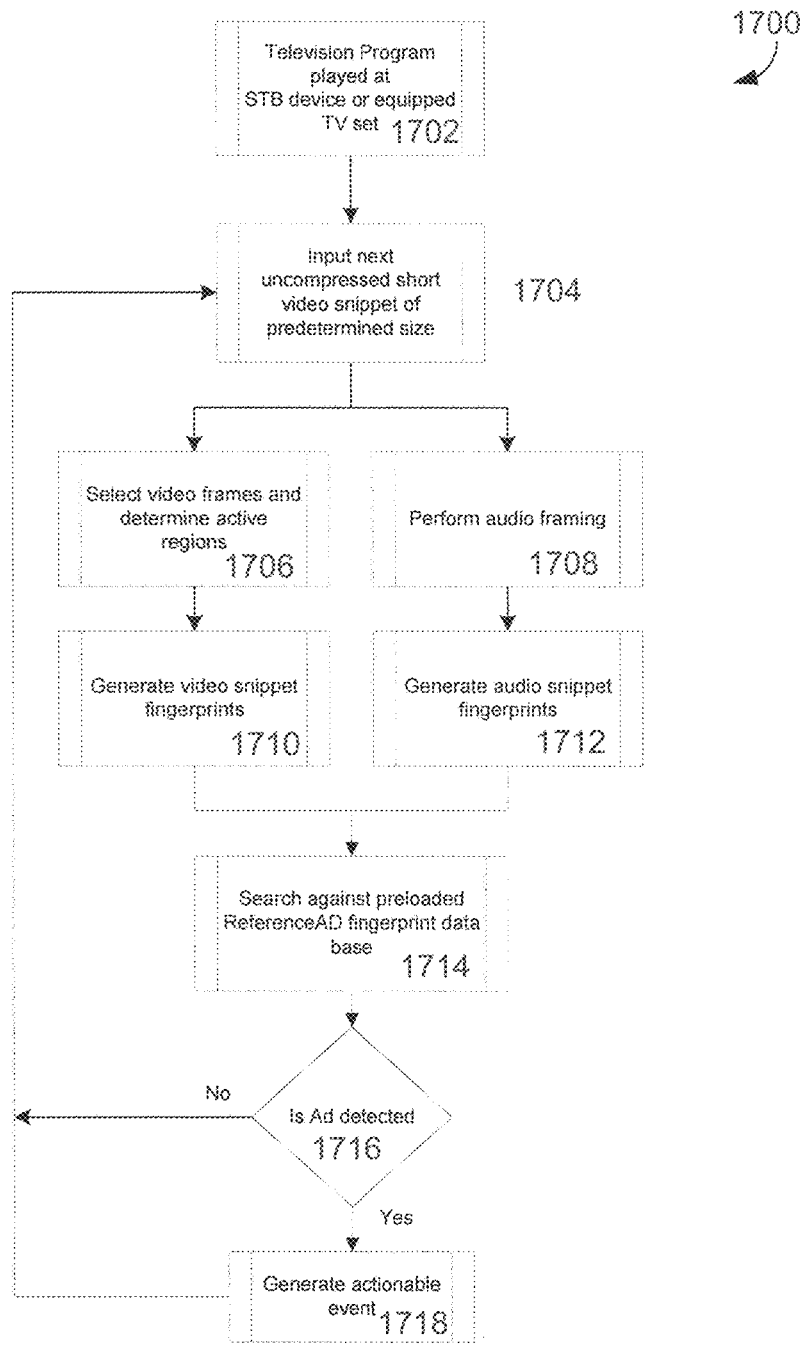
FIG. 17 illustrates a process for video snippet fingerprinting, preloaded reference advertisement database search, and actionable event generation in accordance with an embodiment of the present invention.

FIG. 17 illustrates a process 1700 for video snippet fingerprinting, preloaded reference ad data base search, and actionable event generation in accordance with an embodiment of the present invention. In FIG. 17, the process 1700 generates short contiguous snippets of currently played video collection and real time fingerprints, which are subsequently used as queries into the locally preloaded ReferenceAD database 1516. The ReferenceAD database 1516, as stated above, represents a collection of relevant advertising clips preloaded by the remote reference and query fingerprinting, client monitoring and data or statistics collection remote device 1502. The process 1700 of FIG. 17 starts at step 1702 with a television program, played at STB device or equipped TV set. At step 1704, the played content is broken into contiguous, or noncontiguous, input chunks of uncompressed content for further processing. At step 1706, the input program content chunks from step 1704 are processed for video active region of interest determination and frame selection. At step 1708 and in parallel with step 1706, audio framing processes audio content into predetermined segment sizes. Next, video content fingerprints are generated in step 1710, and in parallel audio content fingerprints are generated in step 1712. In step 1714, audio and video fingerprints are searched against the preloaded ReferenceAD database 1516. In step 1716, a decision is made whether the query fingerprints correspond to any fingerprints in the Reference AD database 1516 of fingerprints. If there is a correspondence between query fingerprints and reference fingerprints, an ad has been detected. Successful ad identification may occur in a fraction of the ad duration, before the entire ad has been played. Ad identification is subsequently used as an actionable event in step 1718. Upon detecting an actionable event an indication of the event is passed to a local application, which may, for example, replace the currently played ad with a locally, regionally relevant ad. The actionable event generated at step 1718 may overlay the currently played ad with additional information important to the local, regional community. Upon reception of an actionable event, the local application may also present a choice of additional programming channels and programming enhancements, offered as a menu overlaid on top of the current programming. After step 1718, the process 1700 proceeds to step 1704. Returning to step 1716, if an ad has not been detected, the process 1700 also proceeds to step 1704.

Figure 18:
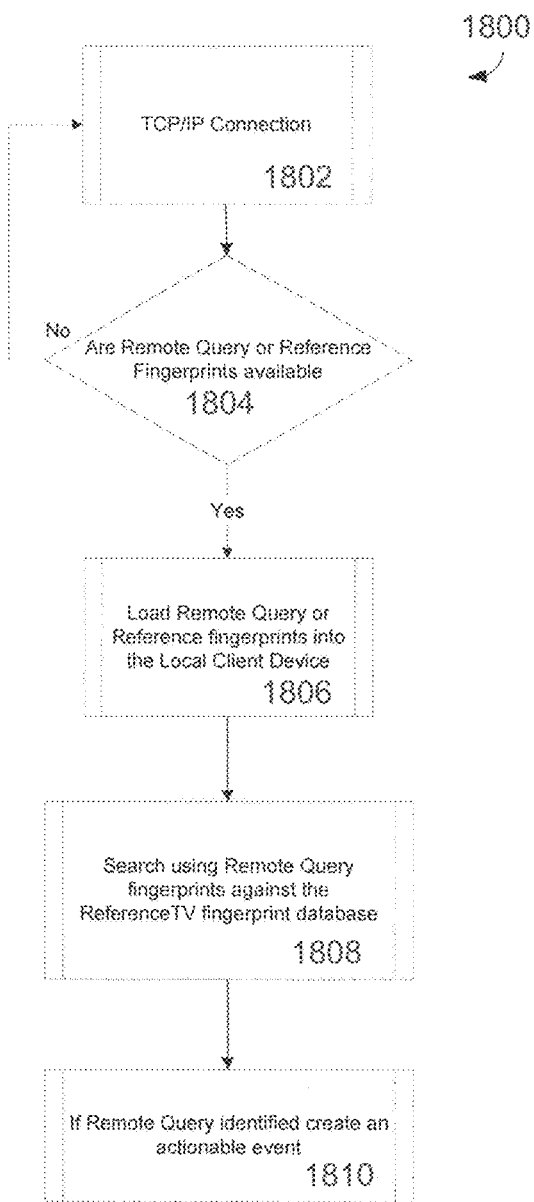
FIG. 18 illustrates a process for remote querying of the ReferenceTV database, and actionable event generation based on recently played television content identification in accordance with an embodiment of the present invention.

FIG. 18 illustrates a process 1800 for remote querying of the ReferenceTV database, and actionable event generation based on recently played television content identification in accordance with an embodiment of the present invention. Beginning at step 1802, an Internet TCP/IP connection is monitored for a desired opening of a communication channel in response to a request for communication. If a request for communications between the remote device 1502 and the client media device 1510 is detected on either side, remote query fingerprints that are available or remote reference ads that are available, or both are transferred over the Internet TCP/IP communication channel at step 1804. If the remote query fingerprints are not available and if the remote reference ads are not available, the process 1800 proceeds back to step 1802. The remote queries or ads are loaded into the local client media device 1510 in step 1806. Subsequently, in step 1808, the local ReferenceTV database 1514 is searched with remotely loaded queries for played video content identification. If reference television content is identified by the search, such as by the search module 212, an actionable event is detected by the actionable event detection utility 1518 which is generally a local application, a locally prescribed actionable event is generated in step 1810. The actionable event may then trigger a plurality of additional viewing experiences offered to the viewer by the local application 1518. Upon reception of a trigger event, the local application 1518 may deliver to a remote monitoring location various statistics 222 related to the viewed television content, including user behavior and preferences. A collection of statistics from the array of STB devices and IP TV sets 1510, 1422, 1436, 1450 may be used at the remote monitoring location for identifying an audience for a particular television program. Through the local application 1518, an actionable event may also trigger local advertising overlaid on top of the current program and it may present a choice of additional programming channels offered as a menu overlaid on top of the current programming.

It is understood that other embodiments of the present invention will become readily apparent to those skilled in the art from the following detailed description, wherein various embodiments of the invention are shown and described by way of the illustrations. As will be realized, the invention is capable of other and different embodiments and its several details are capable of modification in various other respects, all without departing from the present invention. Accordingly, the drawings and detailed description are to be regarded as illustrative in nature and not as restrictive.

The invention claimed is:

1. A computer-implemented method comprising:
fingerprinting, by a client media device, portions of a media sequence that is presented during a period of time by the client media device so as to obtain reference fingerprints;
storing, by the client media device, the reference fingerprints in a reference database of the client media device, wherein the reference database comprises a revolving buffer of programmable length;
after storing the reference fingerprints, receiving, by the client media device from a server device, a query fingerprint corresponding to television programming scheduled to be presented during the period of time, wherein the television programming has a duration, and wherein the reference fingerprints are stored in the revolving buffer for at least the duration of the television programming and then subsequently removed from the revolving buffer;
in response to receiving the query fingerprint, searching, by the client media device, the reference database for any reference fingerprints that match the query fingerprint; and
based on identifying a reference fingerprint of the reference database that matches the query fingerprint, initiating an actionable event on the client media device.

2. The computer-implemented method of claim 1, wherein the method further comprises refreshing, by the client media device, the reference database according to a programmable schedule.

3. The computer-implemented method of claim 1, wherein refreshing the reference database comprises:
removing an oldest reference fingerprint from the reference database; and
adding a new reference fingerprint to the reference database.

4. The computer-implemented method of claim 1, further comprising:
determining, by the client media device, that the reference database is full; and
based on the determining that the reference database is full, removing, by the client media device, an oldest reference fingerprint from the reference database.

5. The computer-implemented method of claim 1, wherein initiating the actionable event comprises replacing a generic advertisement with a targeted advertisement.

6. The computer-implemented method of claim 1, wherein initiating the actionable event comprises providing a menu of enhancement programming options on the client media device.

7. The computer-implemented method of claim 6, wherein the enhancement programming options are related to the television programming.

8. The computer-implemented method of claim 1, wherein initiating the actionable event comprises sending, to a server device, an indication that the client media device presented the television programming.

9. The computer-implemented method of claim 1, wherein the client media device is a network-connected client video device, and wherein the reference fingerprints comprise video fingerprints.

10. The computer-implemented method of claim 1, wherein the client media device is a network-connected client audio device, and wherein the reference fingerprints comprise audio fingerprints.

11. A client media device comprising:
one or more processors; and
a computer-readable medium having stored therein instructions that are executable by the one or more processors to cause the client media device to perform functions comprising:
fingerprinting portions of a media sequence that is presented during a period of time by the client media device so as to obtain reference fingerprints,
storing the reference fingerprints in a reference database of the client media device, wherein the reference database comprises a revolving buffer of programmable length,
after storing the reference fingerprints, receiving, from a server device, a query fingerprint corresponding to television programming scheduled to be presented during the period of time, wherein the television programming has a duration, and wherein the reference fingerprints are stored in the revolving buffer for at least the duration of the television programming and then subsequently removed from the revolving buffer,
in response to receiving the query fingerprint, searching the reference database for any reference fingerprints that match the query fingerprint, and
based on identifying a reference fingerprint of the reference database that matches the query fingerprint, initiating an actionable event on the client media device.

12. The client media device of claim 11, wherein the functions further comprise refreshing the reference database according to a programmable schedule.

13. The client media device of claim 11, wherein the functions further comprise:
determining that the reference database is full; and
based on the determining that the reference database is full, removing an oldest reference fingerprint from the reference database.

14. The client media device of claim 11, wherein initiating the actionable event comprises replacing a generic advertisement with a targeted advertisement.

15. The client media device of claim 11, wherein initiating the actionable event comprises providing a menu of enhancement programming options on the client media device.

16. The client media device of claim 11, wherein initiating the actionable event comprises sending, to a server device, an indication that the client media device presented the television programming.

17. A non-transitory computer-readable medium having stored therein instructions that are executable by one or more processors to cause a client media device to perform functions comprising:

fingerprinting portions of a media sequence that is presented during a period of time by the client media device so as to obtain reference fingerprints;

storing the reference fingerprints in a reference database of the client media device, wherein the reference database comprises a revolving buffer of programmable length;

after storing the reference fingerprints, receiving, from a server device, a query fingerprint corresponding to television programming scheduled to be presented during the period of time, wherein the television programming has a duration, and wherein the reference fingerprints are stored in the revolving buffer for at least the duration of the television programming and then subsequently removed from the revolving buffer;

in response to receiving the query fingerprint, searching the reference database for any reference fingerprints that match the query fingerprint; and based on identifying a reference fingerprint of the reference database that matches the query fingerprint, initiating an actionable event on the client media device.

18. The non-transitory computer-readable medium of claim 17, wherein the functions further comprise refreshing the reference database according to a programmable schedule.

19. The non-transitory computer-readable medium of claim 17, wherein initiating the actionable event comprises replacing a generic advertisement with a targeted advertisement.

20. The non-transitory computer-readable medium of claim 17, wherein initiating the actionable event comprises sending, to a server device, an indication that the client media device presented the television programming.

* * * * *